(12) United States Patent
Matsuoka et al.

(10) Patent No.: US 8,972,065 B2
(45) Date of Patent: Mar. 3, 2015

(54) DISTRIBUTION OF CALL-HOME EVENTS OVER TIME TO AMELIORATE HIGH COMMUNICATIONS AND COMPUTATION PEAKS IN INTELLIGENT CONTROL SYSTEM

(75) Inventors: Yoky Matsuoka, Palo Alto, CA (US); Steven A. Hales, IV, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 304 days.

(21) Appl. No.: 13/440,907

(22) Filed: Apr. 5, 2012

(65) Prior Publication Data

US 2013/0268124 A1 Oct. 10, 2013

(51) Int. Cl.
*G05D 23/19* (2006.01)

(52) U.S. Cl.
USPC .......................................... 700/277; 700/276

(58) Field of Classification Search
None
See application file for complete search history.

(56) References Cited

U.S. PATENT DOCUMENTS

2008/0313261 A1* 12/2008 Kouda .......................... 709/201
2010/0083356 A1* 4/2010 Steckley et al. ................... 726/5

* cited by examiner

*Primary Examiner* — Ryan Jarrett
(74) *Attorney, Agent, or Firm* — Kilpatrick Townsend & Stockton LLP

(57) ABSTRACT

The current application is directed to an intelligent control system that includes intelligent thermostats and remote servers that spread call-home events over time to avoid large peak computational and communications loads on intelligent-control-system servers. The spreading of call-home vents over time is effected by use of call-home splay values pseudorandomly generated for intelligent thermostats.

18 Claims, 28 Drawing Sheets

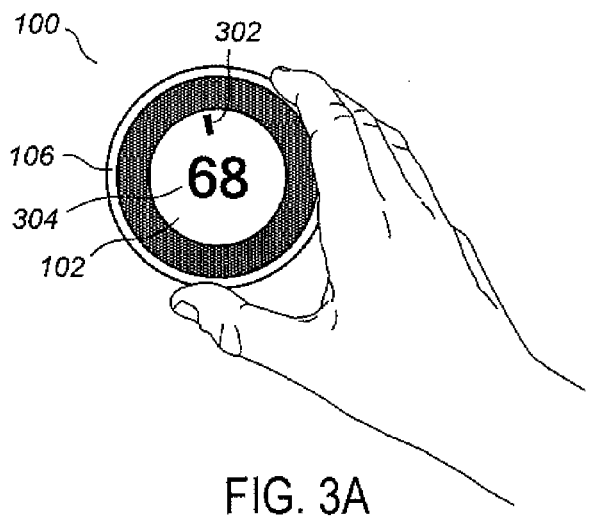
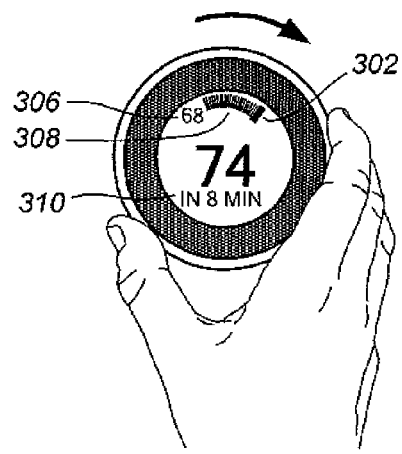
FIG. 3A  FIG. 3B
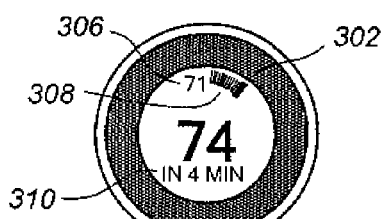  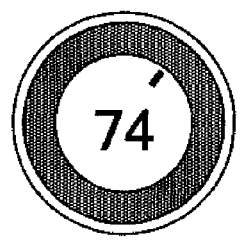
FIG. 3C  FIG. 3D  FIG. 3E
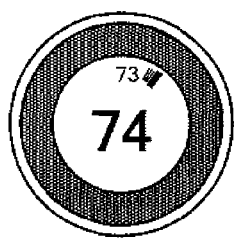  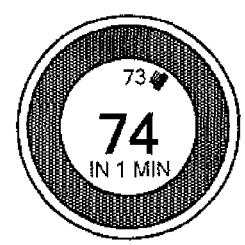
FIG. 3F  FIG. 3G  FIG. 3H
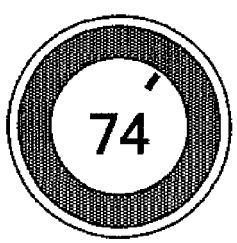 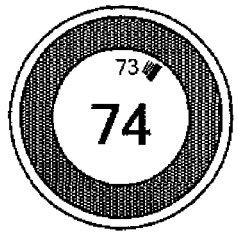 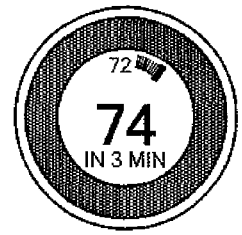
FIG. 3I  FIG. 3J  FIG. 3K

US 8,972,065 B2

DISTRIBUTION OF CALL-HOME EVENTS OVER TIME TO AMELIORATE HIGH COMMUNICATIONS AND COMPUTATION PEAKS IN INTELLIGENT CONTROL SYSTEM

FIELD

The current patent relates to intelligent-thermostat-controlled HVAC systems and other intelligently controlled environment-conditioning systems and, in particular, to intelligently controlled environment-conditioning systems that distribute call-home events over time to avoid peak computational and communications loading of servers.

BACKGROUND

While substantial effort and attention continues toward the development of newer and more sustainable energy supplies, the conservation of energy by increased energy efficiency remains crucial to the world's energy future. Along with improvements in the physical plant associated with home heating and cooling, including improvements in insulation, higher efficiency furnaces, and in other such improvements, substantial increases in energy efficiency can be achieved by better control and regulation of home heating and cooling equipment. By efficiently controlling operation of heating, ventilation, and air conditioning (HVAC) equipment, substantial energy can be saved.

Many currently available HVAC thermostatic control systems can be characterized as belonging to one of two categories: (1) a first category that includes many simple, non-programmable home thermostats, each typically consisting of a single mechanical or electrical dial for setting a desired temperature and a single HEAT-FAN-OFF-AC switch; and (2) a second category that includes many programmable thermostats, which have become more prevalent in recent years and which feature many different HVAC-system settings that can be individually manipulated. While being easy to use for even the most unsophisticated occupant, thermostats of the first category are performed manually by the user. As a result, substantial energy-saving opportunities are often missed for all but the most vigilant users. Moreover, advanced energy-saving settings are not generally provided, including an ability to specify a custom temperature swing, the difference between the desired set temperature and actual current temperature that triggers activation of the heating/cooling unit. Users of thermostats of the second category are often intimidated by a large number of switches and controls, and therefore seldom adjust the manufacturer defaults to optimize their own energy usage despite the fact that these thermostats are capable of operating HVAC equipment with energy-saving profiles. Indeed, in an unfortunately large number of cases, a home user may permanently operate the unit in a "temporary" or "hold" mode, manually manipulating the displayed set temperature as if the unit were a thermostat of the first category.

SUMMARY

The current application discusses intelligent control systems that include a programmable device, generally an intelligent thermostat, for locally controlling an HVAC system. The intelligent thermostat includes high-power-consuming circuitry that performs, while in an active state, a number of high power activities, including operating wireless communications, driving display circuitry, displaying graphical information to a user, and performing calculations relating to learning. The high-power consuming circuitry uses substantially less power while in an INACTIVE, or SLEEP, state that when in the ACTIVE state. The intelligent thermostat also includes low-power-consuming circuitry to perform a number of low power activities, including: transitioning the high-power circuitry from the INACTIVE state to the ACTIVE state; polling sensors, including temperature and occupancy sensors; and switching HVAC functions between ON and OFF states. The intelligent thermostat also includes power-stealing circuitry that harvests power from an HVAC-triggering circuit and a power-storage medium, such as a rechargeable battery, that stores power harvested by the power-stealing circuitry for use by other intelligent-thermostat circuitry, including the above-mentioned high-power-consuming. In many implementations, the high-power consuming circuitry includes a microprocessor that is located on a head unit and the low-power consuming circuitry includes a microcontroller and is located on a backplate. The current application is directed to an intelligent control system that includes at least one intelligent thermostat and remote servers. The current application is directed to an intelligent control system that includes intelligent thermostats and remote servers that spread call-home events over time to avoid large peak computational and communications loads on intelligent-control-system servers.

BRIEF DESCRIPTION OF THE DRAWINGS

FIGS. 3A-3K illustrate user temperature adjustment based on rotation of the outer ring along with an ensuing user interface display.

DETAILED DESCRIPTION

Figure 1A:
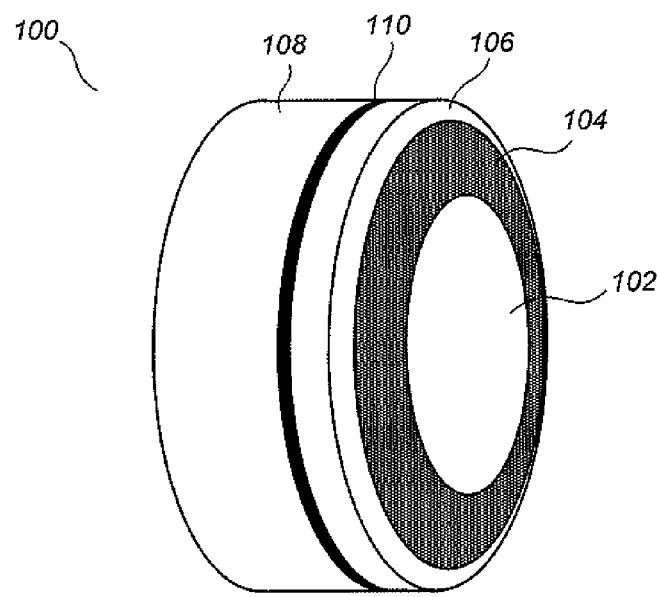
FIG. 1A illustrates a perspective view of a versatile sensing and control unit (VSCU unit).

The current application is directed to intelligent control systems that include one or more intelligent thermostats that each controls one or more HVAC systems, the intelligent thermostats alternatively referred to as "versatile sensing and control units" (VSCU units). Each VSCU unit provides energy-saving HVAC control functionality while, at the same time, is visually appealing and easy to use. Each VSCU unit includes selectively layered functionality, exposing unsophisticated users to a simple user interface but providing advanced users many different energy-saving and energy tracking functionalities. Even for the case of unsophisticated users, a VSCU unit provides advanced energy-saving functionality that runs in the background. In addition, a VSCU unit uses multi-sensor technology to learn about its heating and cooling environment and optimize control settings and parameters. A VSCU unit also learns about users via interactive information gathering methods, including a setup interview in which a user answers a few simple questions and, continuing over time, by using multi-sensor technology to detect user occupancy and control patterns, by tracking user control inputs, and by additional interactive information-gathering methods. On an ongoing basis, the VSCU unit processes the learned and sensed information and automatically adjusts its environmental control settings to optimize energy usage while, at the same time, maintaining the living space at optimal levels according to the learned occupancy patterns and comfort preferences of the user. The VSCU unit additionally promotes energy-saving behavior of users by displaying, at selected times, information that encourages reduced energy usage, including characterizations of historical energy cost performance, forecasted energy costs, and displayed congratulations and encouragement.

When the VSCU unit is connected to the internet via a home network, such as through IEEE 802.11 (Wi-Fi) connectivity, a VSCU may transmit real-time or aggregated home energy performance data to a utility company, a VSCU data-service provider, VSCU units in other locations, and/or other data recipients. The VSCU may; receive real-time or aggregated home energy performance data from a utility company, a VSCU data service provider, VSCU units in other locations, and/or other data sources. The VSCU may receive new energy-control executables and/or other types of control upgrades from one or more VSCU data service providers and/or other sources. The VSCU may receive current and forecasted weather information for inclusion in energy-saving control routines and user control commands from a user's computer, network-connected television, smart phone, and/or other stationary or portable data-communication appliance. The VSCU may provide an interactive user interface to the user through a user's data-communication appliance. The VSCU may receive control commands and information from an external energy-management advisor, such as a subscription-based service aimed at leveraging collected information from multiple sources to generate the best possible energy-saving control commands and/or profiles for subscribers and may receive control commands and information from an external energy management authority, such as a utility company to whom limited authority has been voluntarily given to control the VSCU in exchange for rebates or other cost incentives. The VSCU may additionally provide alarms, alerts, and other information to the user on a user's digital device and/or that of another person or organization designated for receiving the alarms and alerts by the user. The need for transmission of alarms and alerts may be determined by the VSCU by sensing various types of events within the environment of the VSCU, including both HVAC-related events and non-HVAC related events.

The environment controlled by an intelligent control system may include all or portions of a residential home, a duplex, townhome, multi-unit apartment building, hotel, retail store, office building, industrial building, and other living spaces and work spaces serviced by one or more HVAC systems. Users of intelligent control systems and VSCUs may include residents, building owners, landlords, and other individuals who direct control an environment serviced by an HVAC system through interfaces provided by VSCUs.

The phrases "set point" and "temperature set point" refer to a target temperature setting of a temperature control system, generally set by a user or automatically set according to a schedule. Many thermostatic functionalities described below apply in both heating and cooling contexts. To avoid unnecessary repetition, some examples may be presented in only one of these contexts, without mentioning the other. Therefore, where a particular example is set forth, below, in the context of home heating, the present teachings are likewise applicable to the counterpart context of home cooling, and vice versa, to the extent such counterpart application would be logically consistent.

FIG. 1A illustrates a perspective view of a versatile sensing and control ("VSCU") unit. The VSCU unit 100 preferably has a sleek, elegant appearance that does not detract from home decoration. The VSCU unit 100 comprises a main body 108 that is preferably circular with a diameter of about 8 cm and that has a visually pleasing outer finish, such as a satin nickel or chrome finish. A cap-like structure comprising a rotatable outer ring 106, a sensor ring 104, and a circular display monitor 102 is separated from the main body 108 by a small peripheral gap 110. The outer ring 106 has an outer finish similar to that of the main body 108, while the sensor ring 104 and circular display monitor 102 have a common circular glass or plastic outer covering that is gently arced in an outward direction. The sensor ring 104 contains any of a wide variety of sensors including infrared sensors, visible-light sensors, and acoustic sensors. The glass or plastic that covers the sensor ring 104 is generally smoked or mirrored so that the sensors themselves are not visible to the user. An air-venting functionality is provided to allow the ambient air to be sensed by the internal sensors.

Figures 1B, 1C:
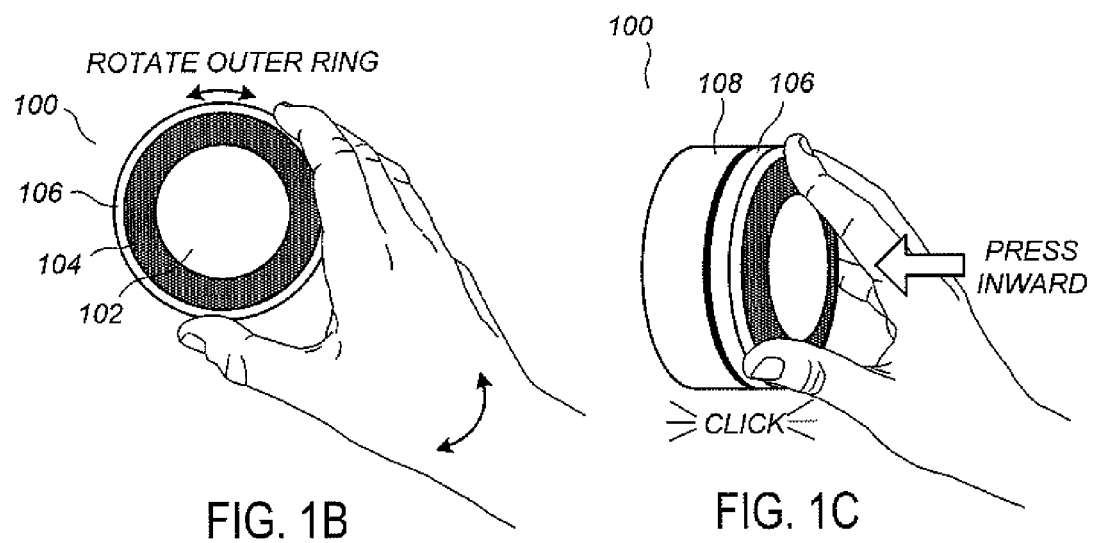
FIGS. 1B-1C illustrate the VSCU unit as it is being controlled by the hand of a user.

FIGS. 1B-1C illustrate the VSCU unit as it is being controlled by the hand of a user. In one example, the VSCU unit 100 is controlled by only two types of user input, the first being a rotation of the outer ring 106 (FIG. 1B), and the second being an inward push on the outer ring 106 (FIG. 1C) until an audible and/or tactile click occurs. For one example, the inward push of FIG. 1C only causes the outer ring 106 to move forward, while in another example the entire cap-like structure, including both the outer ring 106 and the glass covering of the sensor ring 104 and circular display monitor 102, move inwardly together when pushed. In one example, the sensor ring 104, the circular display monitor 102, and their common glass covering do not rotate with outer ring 106.

By user rotation of the outer ring 106 ("ring rotation") and inward pushing of the outer ring 106 ("inward click") responsive to intuitive and easy-to-read prompts on the circular display monitor 102, the VSCU unit 100 is capable of receiving information from the user for basic setup and operation. Generally, the outer ring 106 is mechanically mounted in a manner that provides a smooth yet viscous feel to the user, which promotes an overall feeling of elegance while also reducing spurious or unwanted rotational inputs. In one example, the VSCU unit 100 recognizes three different types of user inputs via ring rotation and inward click: (1) ring rotate left, (2) ring rotate right, and (3) inward click. In other examples, more complex fundamental user inputs can be recognized, including double-click or triple-click inward presses, speed-sensitive, and acceleration-sensitive rotational inputs.

A discrete mechanical HEAT-COOL toggle switch, HEAT-OFF-COOL selection switch, or HEAT-FAN-OFF-COOL switch is generally not included in the VSCU unit 100, contributing to the overall visual simplicity and elegance of the VSCU unit 100 and facilitating the provision of advanced control abilities. Generally, no electrical proxy for such a discrete mechanical switch is included. Instead, the switching between these settings is performed under computerized control of the VSCU unit 100 responsive to multi-sensor readings, programming, and/or the above-described ring-rotation and inward-click user inputs.

Figure 2A:
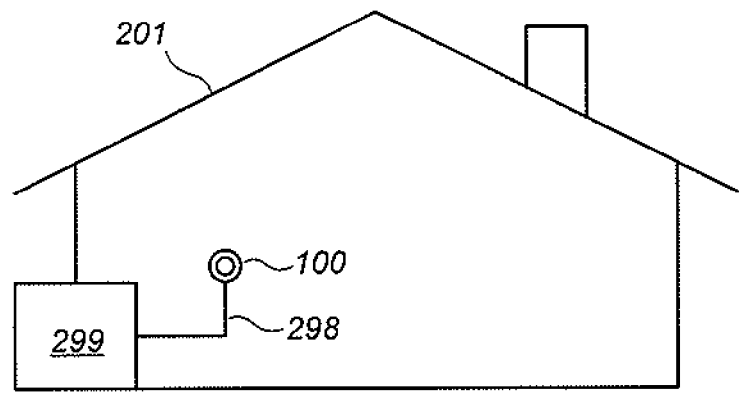
FIG. 2A illustrates the VSCU unit as installed in a house having an HVAC system and a set of control wires.

FIG. 2A illustrates the VSCU unit as installed in a house having an HVAC system and a set of control wires. The VSCU unit 100 is well suited for installation by contractors in new home construction and/or in the context of complete HVAC system replacement. However, the VSCU unit 100 may also serve as a replacement thermostat in an existing home. In either case, the VSCU unit 100 can facilitate inserting an entire energy-saving technology platform into the home. The phrase "VSCU Efficiency Platform" refers to products and services that are technologically compatible with the VSCU unit 100 and/or with devices and programs that support the operation of the VSCU unit 100.

Figure 2B:
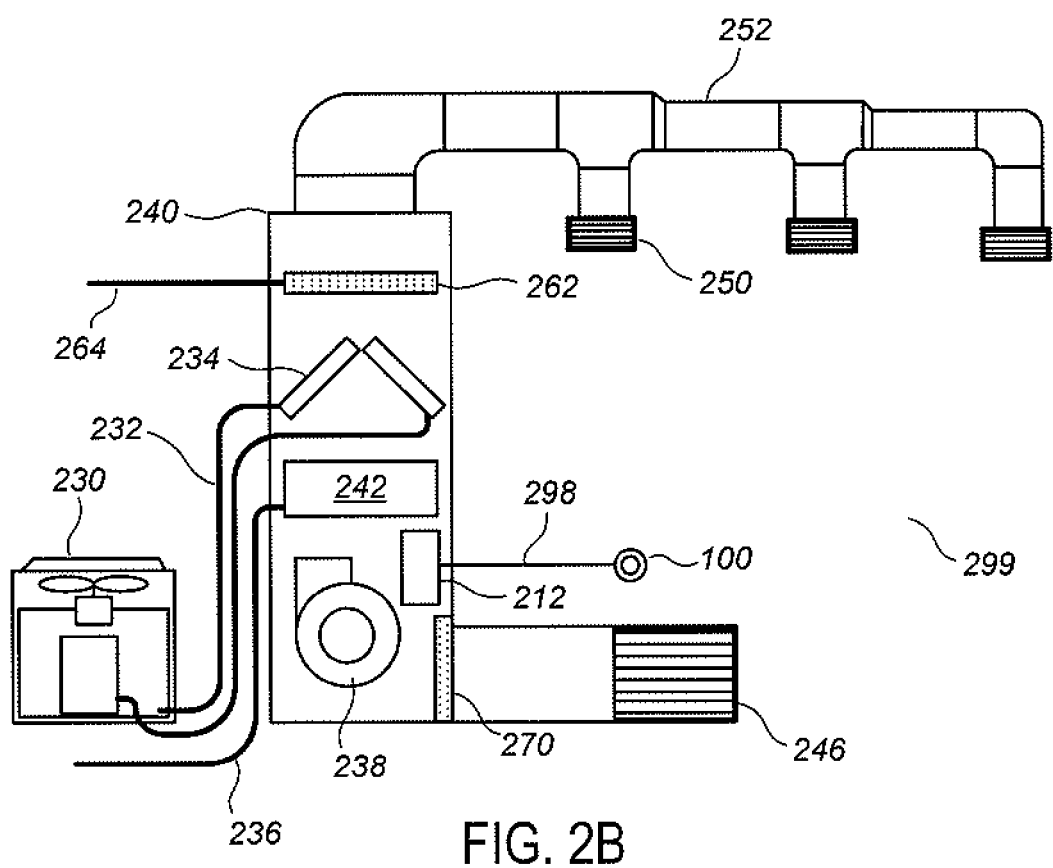
FIG. 2B illustrates an exemplary diagram of the HVAC system of FIG. 2A.

FIG. 2B illustrates an exemplary diagram of the HVAC system of FIG. 2A. HVAC system 299 provides heating, cooling, ventilation, and/or air handling for an enclosure, such as the single-family home 201 depicted in FIG. 2A. The HVAC system 299 depicts a forced-air type heating system, although according to other examples, other types of systems can be used. In heating, heating coils or elements 242 within air handler 240 provide a source of heat using electricity or gas via line 236. Cool air is drawn from the enclosure via return air duct 246 through filter 270 using fan 238 and is heated by the heating coils or elements 242. The heated air flows back into the enclosure at one or more locations through a supply air duct system 252 and supply air grills such as grill 250. In cooling, an outside compressor 230 passes a gas such as Freon through a set of heat exchanger coils to cool the gas. The gas then goes via line 232 to the cooling coils 234 in the air handlers 240 where it expands, cools and cools the air being circulated through the enclosure via fan 238. According to some examples a humidifier 262 is also provided to moisten the air using water provided by a water line 264. Although not shown in FIG. 2B, according to some examples the HVAC system for the enclosure has other known components such as dedicated outside vents to pass air to and from the outside, one or more dampers to control airflow within the duct systems, an emergency heating unit, and a dehumidifier. The HVAC system is selectively actuated via control electronics 212 that communicate with the VSCU 100 over control wires 298.

FIGS. 3A-3K illustrate user temperature adjustment based on rotation of the outer ring along with an ensuing user interface display. In one example, prior to the time depicted in FIG. 3A in which the user has approached the VSCU unit 100, the VSCU unit 100 has set the circular display monitor 102 to be entirely blank ("dark"), which corresponds to a state of inactivity. As the user walks up to the display, the user's presence is detected by one or more sensors in the VSCU unit 100, at which point the circular display monitor 102 is automatically turned on. When this happens, as illustrated in FIG. 3A, the circular display monitor 102 displays the current set point in a large font at a center readout 304. Also displayed is a set point icon 302 disposed along a periphery of the circular display monitor 102 at a location that is spatially representative of the current set point. Although it is electronic, the set point icon 302 is reminiscent of older mechanical thermostat dials.

The example of FIG. 3A assumes a scenario for which the actual current temperature of 68 is equal to the set point temperature of 68. For a case in which the user approaches the VSCU unit 100 when the actual current temperature is different than the set point temperature, the display would also include an actual temperature readout and a trailing icon, which are described further below in the context of FIGS. 3B-3K.

Referring now to FIG. 3B, as the user turns the outer ring 106 clockwise, the increasing value of the set point temperature is instantaneously provided at the center readout 304 and the set point icon 302 moves in a clockwise direction around the periphery of the circular display monitor 102 to a location representative of the increasing set point. Whenever the actual current temperature is different than the set point temperature, an actual temperature readout 306 is provided in relatively small digits along the periphery of the circular a location spatially representing the actual current temperature. Further provided is a trailing icon 308, also referred to as a "tail icon" or "difference-indicating icon," which extends between the location of the actual temperature readout 306 and the set point icon 302. Further provided is a time-to-temperature readout 310 that is indicative of a prediction, as computed by the VSCU unit 100, of the time interval required for the HVAC system to bring the temperature from the actual current temperature to the set point temperature.

FIGS. 3C-3K illustrate views of the circular display monitor 102 at exemplary instants in time after the user set point change that was completed in FIG. 3B (assuming that the circular display monitor 102 has remained active, such as during a preset post-activity time period, responsive to the continued proximity of the user, or responsive to the detected proximity of another occupant). Thus, at FIG. 3C, the current actual temperature is about halfway from the old set point to the new set point, and, in FIG. 3D, the current actual temperature is almost at the set point temperature. As illustrated in FIG. 3E, both the trailing icon 308 and the actual temperature readout 306 disappear when the current actual temperature reaches the set point temperature and the heating system is turned off. Then, as typically happens in home heating situations, the actual temperature begins to sag (FIG. 3F) until the permissible temperature swing is reached, at which point the heating system is again turned on and the temperature rises to the set point (FIGS. 3H-3I) and the heating system is turned off. In this example, the swing is set to two degrees. The current actual temperature then begins to sag again (FIGS. 3J-3K), and the cycle continues.

Figure 4:
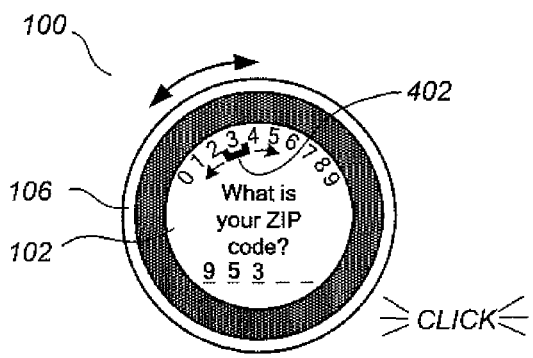
FIG. 4 illustrates a data input functionality provided by the user interface of the VSCU unit.

FIG. 4 illustrates a data input functionality provided by the user interface of the VSCU unit. The data-input functionality is provided for a particular example in which the user is asked, during a congenial setup interview, to enter the user's ZIP code. Responsive to a display of digits 0-9 distributed around a periphery of the circular display monitor 102 along with a selection icon 402, the user turns the outer ring 106 to move the selection icon 402 to the appropriate digit, and then provides an inward click command to enter that digit.

In one example, the VSCU unit 100 is programmed to provide a software-lockout functionality, requiring a person to enter a password or combination before the VSCU unit 100 will accept control inputs. The user interface for password request and entry can be similar to that shown in FIG. 4.

Figure 5A:
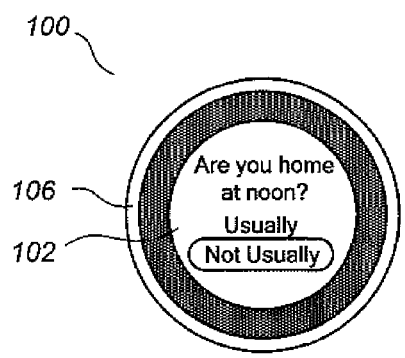
FIGS. 5A-5B illustrate a similar data input functionality provided by the user interface of the VSCU unit for answering various questions during the set up interview.
Figure 5B:
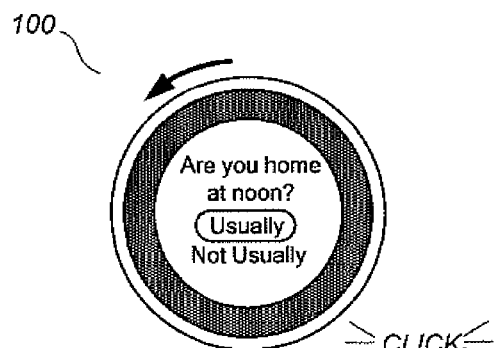

FIGS. 5A-5B illustrate a similar data input functionality provided by the user interface of the VSCU unit for answering various questions during the set up interview. The user rotates the outer ring 106 until the desired answer is highlighted, and then provides an inward click command to enter that answer.

Figure 6A:
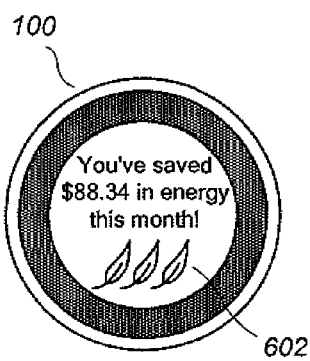
FIGS. 6A-6C illustrate some of the many examples of user interface displays provided by the VSCU unit.
Figure 6B:
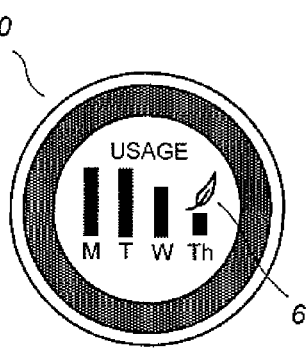
Figure 6C:
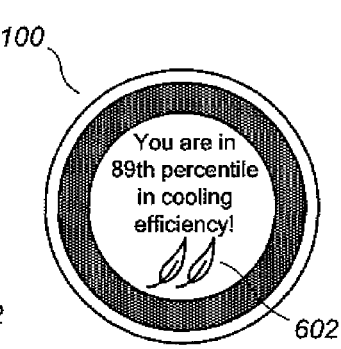

FIGS. 6A-6C illustrate some of the many examples of user interface displays provided by the VSCU unit. At selected times, upon user request, or at other times, including random points in time, the VSCU unit 100 displays information on its visually appealing user interface that encourages reduced energy usage. In one example shown in FIG. 6A, the user is shown a message of congratulations regarding a particular energy-saving accomplishment achieved by the user. It has been found particularly effective to include pictures or symbols, such as leaf icons 602, that evoke pleasant feelings or emotions in the user for providing positive reinforcement of energy-saving behavior.

FIG. 6B illustrates another example of an energy performance display that can influence user energy-saving behavior. The performance display comprises a display of the household's recent energy use on a daily basis and a positive-feedback leaf icon 602 for days of relatively low energy usage. Messages such as those of FIG. 6A can be displayed for customers who are not Wi-Fi enabled, based on the known cycle times and durations of the home HVAC equipment as tracked by the VSCU unit 100. Indeed, although a bit more involved, messages such as those of FIG. 6A can also be displayed for customers who are not Wi-Fi enabled, based on the known HVAC cycle times and durations combined with pre-programmed estimates of energy costs for their ZIP code and/or user-entered historical energy cost information from past utility bills.

For another example shown in FIG. 6C, the user is shown information about the user's energy performance status or progress relative to a population of other VSCU-equipped owners who are similarly situated from an energy usage perspective. For this type of display, and similar displays in which data from other homes and/or central databases is required, the VSCU unit 100 needs to be network-enabled. It has been found particularly effective to provide competitive or game-style information to the user as an additional means to influence energy-saving behavior. As illustrated in FIG. 6B, positive-feedback leaf icons 602 can be added to the display if the user's competitive results are positive. Optionally, the leaf icons 602 can be associated with a frequent flyer miles-type point-collection scheme or carbon credit-type business method, as administered, for example, by an external VSCU data service provider so that a tangible, fiscal reward is also associated with the emotional reward.

In some examples, the VSCU unit 100 is manufactured and sold as a single, monolithic structure containing electrical and mechanical connections on the back of the unit. In some examples, the VSCU 100 is manufactured and/or sold in different versions or packaging groups depending on the particular capabilities of the manufacturer(s) and the particular needs of the customer. For example, the VSCU unit 100 is provided, in some examples, as the principal component of a two-part combination consisting of the VSCU 100 and one of a variety of dedicated docking devices, as described further below.

Figure 7:
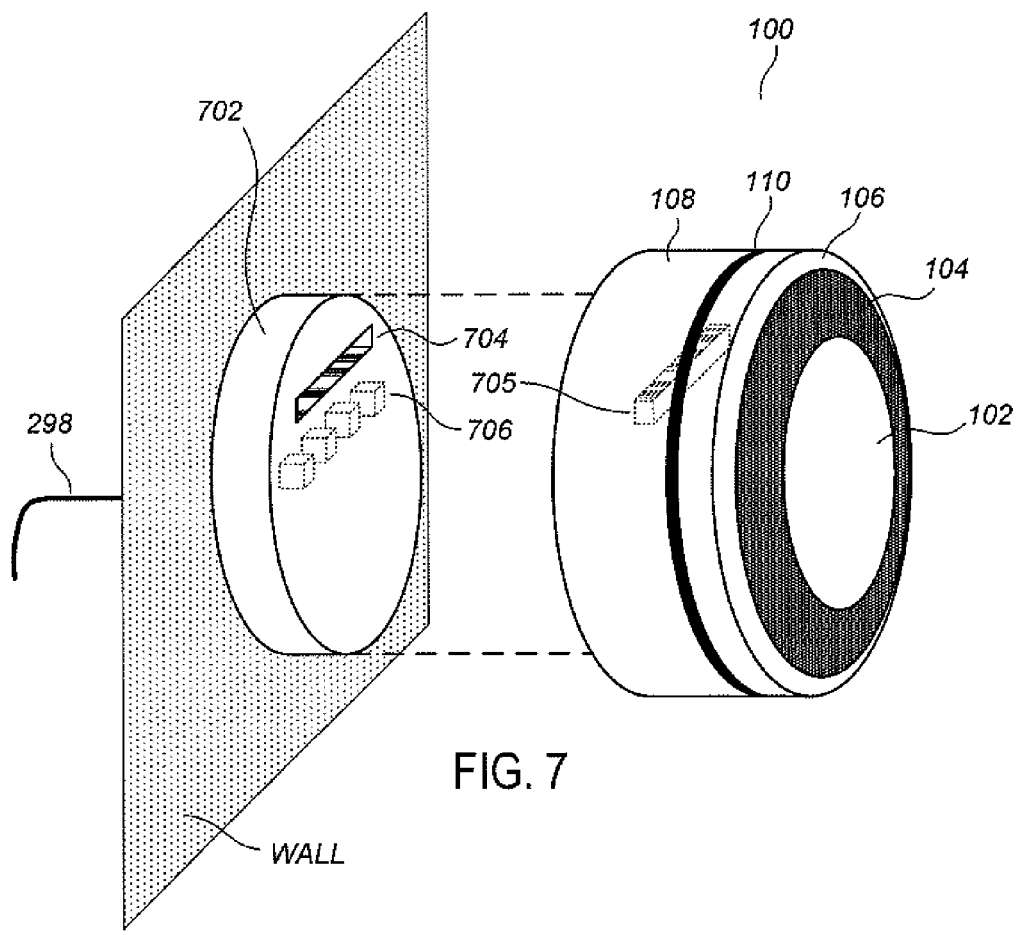
FIG. 7 illustrates an exploded perspective view of the VSCU unit and an HVAC-coupling wall dock.

FIG. 7 illustrates an exploded perspective view of the VSCU unit and an HVAC-coupling wall dock. For first-time customers who are going to be replacing an old thermostat, the VSCU unit 100 is provided in combination with HVAC-coupling wall dock 702. The HVAC-coupling wall dock 702 comprises mechanical hardware for attaching to the wall and electrical terminals for connecting to the HVAC wiring 298 that will be extending out of the wall in a disconnected state when the old thermostat is removed. The HVAC-coupling wall dock 702 is configured with an electrical connector 704 that mates to a counterpart electrical connector 705 in the VSCU 100.

For the initial installation process, the customer first installs the HVAC-coupling wall dock 702, including necessary mechanical connections, to the wall and HVAC wiring connections to the HVAC wiring 298. Once the HVAC-coupling wall dock 702 is installed, the next task is to slide the VSCU unit 100 over the wall dock to mate the electrical connectors 704/705. The components are generally configured so that the HVAC-connecting wall dock 702 is entirely hidden underneath and inside the VSCU unit 100.

In one example, the HVAC-connecting wall dock 702 is a relatively bare-bones device having the function of facilitating electrical connectivity between the HVAC wiring 298 and the VSCU unit 100. In another example, the HVAC-coupling wall dock 702 is equipped to perform and/or facilitate, in either a duplicative sense and/or a primary sense, one or more of the functionalities attributed to the VSCU unit 100 in the instant disclosure, using a set of electrical, mechanical, and/or electromechanical components 706. One particularly useful functionality is for the components 706 to include power-extraction circuitry for extracting usable power from the HVAC wiring 298, at least one wire of which carries a 24-volt AC signal in accordance with common HVAC wiring practice. The power-extraction circuitry converts the 24-volt AC signal into DC power that is usable by the processing circuitry and display components of the main unit 701.

The division and/or duplication of functionality between the VSCU unit 100 and the HVAC-coupling wall dock 702 can be provided in many different ways. In another example, the components 706 of the HVAC-coupling wall dock 702 can include one or more sensing devices, such as an acoustic sensor, for complementing the sensors provided on the sensor ring 104 of the VSCU unit 100. In another example, the components 706 can include wireless communication circuitry compatible with one or more wireless communication protocols, such as the Wi-Fi and/or ZigBee protocols. In another example, the components 706 can include external AC or DC power connectors. In another example, the components 706 can include wired data communications jacks, such as an RJ45 Ethernet jack, an RJ11 telephone jack, or a USB connector.

Provided in accordance with one or more examples related to the docking capability shown in FIG. 7 are further devices and features that advantageously promote expandability of the number of sensing and control nodes that can be provided throughout the home. In one example, a tabletop docking station (not shown) is provided for docking of a second instance of the VSCU unit 100, which is referred to as an "auxiliary VSCU" unit (not shown). The tabletop docking station and the auxiliary VSCU unit can be separately purchased by the user, either at the same time of purchase of the original VSCU unit 100 or at a later time. The tabletop docking station is similar in functionality to the HVAC-coupling wall dock 702, except that it does not require connection to the HVAC wiring 298 and is conveniently powered by a standard wall outlet. In another example, instead of being identical to the original VSCU unit 100, the auxiliary VSCU unit can be a differently labeled version.

The phrase "primary VSCU unit" refers to one that is electrically connected to actuate an HVAC system in whole or in part, which would necessarily include the first VSCU unit purchased for any home, while the phrase "auxiliary VSCU unit" refers to one or more additional VSCU units not electrically connected to actuate an HVAC system in whole or in part. An auxiliary VSCU unit, when docked, will automatically detect the primary VSCU unit and will automatically be detected by the primary VSCU unit, such as by Wi-Fi or ZigBee wireless communication. Although the primary VSCU unit remains the sole provider of electrical actuation signals to the HVAC system, the two VSCU units will otherwise cooperate in unison for improved control heating and cooling control functionality, such improvement being enabled by added multi-sensing functionality provided by the auxiliary VSCU unit as well as by additional processing power provided to accommodate more powerful and precise control algorithms. Because the auxiliary VSCU unit can accept user control inputs just like the primary VSCU unit, user convenience is also enhanced. Thus, for example, where the tabletop docking station and the auxiliary VSCU unit are placed on a nightstand next to the user's bed, the user is not required to get up and walk to the location of the primary VSCU unit to manipulate the temperature set point, view energy usage, or otherwise interact with the system.

In one example, VSCU units sold by the manufacturer are identical in their core functionality, each being able to serve as either a primary VSCU unit or auxiliary VSCU unit as the case requires, although the different VSCU units may have different colors, ornamental designs, memory capacities, and so forth. For this example, the user is able to interchange the positions of VSCU units by simple removal of each one from its existing docking station and placement into a different docking station. There is an environmentally, technically, and commercially appealing ability for the customer to upgrade to the newest, latest VSCU designs and technologies without the need to throw away the existing VSCU unit.

In other examples, different VSCU units sold by a manufacturer can have different functionalities in terms of their abilities to serve as primary versus auxiliary VSCU units. The hardware cost of an auxiliary-only VSCU unit may be substantially less than that of a dual-capability primary/auxiliary VSCU unit. In other examples, primary VSCU units may use one kind of docking connection system and auxiliary VSCU units may use a different kind of docking connection system. In still other examples, primary VSCU units may feature the docking-station capability of FIG. 7, but auxiliary VSCU units, wherein auxiliary VSCU units may not.

Figure 8A:
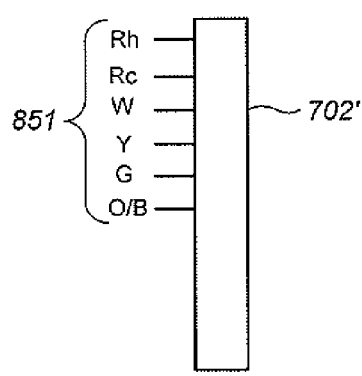
FIGS. 8A-B illustrates HVAC-coupling wall docks.

FIG. 8A illustrates an HVAC-coupling wall dock. The HVAC-coupling wall dock 702', which includes a set of input wiring ports 851, represents a first version of the HVAC-coupling wall dock 702 of FIG. 7 that is manufactured and sold in a simple or do-it-yourself ("DIY") product package in conjunction with the VSCU unit 100. The input wiring ports 851 of the HVAC-coupling wall dock 702' are limited in number and selection to represent a business and technical compromise between providing enough control signal inputs to meet the needs of a reasonably large number of HVAC systems in a reasonably large number of households, while, at the same time, not intimidating or overwhelming the do-it-yourself customer with an overly complex array of connection points. In one example, the input wiring ports 851 include: Rh (24 VAC heating call switch power); Rc (24VAC cooling call switch power); W (heating call); Y (cooling call); G (fan); and O/B (heat pump).

The HVAC-coupling wall dock 702' is configured and designed in conjunction with the VSCU unit 100, including both hardware aspects and programming aspects, to provide a simple DIY installation process that further provides an appreciable degree of fool proofing for protecting the HVAC system from damage and for ensuring that signals are directed to appropriate corresponding equipment. In one example, the HVAC-coupling wall dock 702' is equipped with a small mechanical detection switch (not shown) for each distinct input port, such that insertion of a wire and non-insertion of a wire is automatically detected and a corresponding indication signal is provided to the VSCU 100 upon initial docking. In this way, the VSCU 100 has knowledge for each individual input port whether a wire has, or has not been, inserted into that port. Preferably, the VSCU unit 100 is also provided with electrical sensors (e.g., voltmeter, ammeter, and ohmmeter) corresponding to each of the input wiring ports 851. The VSCU 100 is therefore enabled, by suitable programming, to perform sanity checks at initial installation. By way of example, if there is no input wire at either the Rc or Rh terminal, or if there is no AC voltage sensed at either of these terminals, further initialization activity can be immediately halted, and the user notified on the circular display monitor 102, because there is either no power at all or the user has inserted the Rc and/or Rh wires into the wrong terminal. By way of further example, if there is a live voltage on the order of 24 VAC detected at any of the W, Y, and G terminals, then it can be concluded that the user has placed the Rc and/or Rh wire in the wrong place, and appropriate installation halting and user notification can be made.

One feature provided according to one example relates to automated opening versus automated shunting of the Rc and Rh terminals by the VSCU unit 100. In many common home installations, instead of there being separate wires provided for Rc (24 VAC heating call switch power) and Rh (24 VAC cooling call switch power), there is only a single 24VAC call switch power lead provided. This single 24VAC lead, which might be labeled R, V, Rh, or Rc, depending on the unique history and geographical location of the home, provides the call switch power for both heating and cooling. For such cases, a thermostat has the Rc and Rh input ports shunted together so that the power from a single lead can be respectively accessed by the heating and cooling call switches.

However, in many other common home installations, there are separate 24 VAC wires provided for Rc and Rh running from separate transformers and, when so provided, it is important not to shunt them together to avoid equipment damage. These situations are resolved historically by a professional installer examining the HVAC system and ensuring that a shunting lead (or equivalent DIP switch setting) is properly installed or not installed as appropriate and/or the presence on most thermostats of a discrete user-toggled mechanical or electromechanical switch to ensure that heating and cooling are not simultaneously activated. The VSCU 100 is equipped and programmed to automatically test the inserted wiring to classify the user's HVAC system into one of the above two types (i.e., single call power lead versus dual call power leads), to automatically ensure that the Rc and Rh input ports remain electrically segregated when the user's HVAC system is determined to be of the dual call power lead type, and to automatically shunt the Rc and Rh input ports together when the user's HVAC system is determined to be of the single call power lead type. The automatic testing can comprise, without limitation, electrical sensing such as that provided by voltmeter, ammeters, ohmmeters, and reactance-sensing circuitry, as well as functional detection as described further below.

The VSCU may conduct automated functional testing of the HVAC system by the VSCU unit 100 based on the wiring insertions made by the installer as detected by the small mechanical detection switches at each distinct input port. Thus, for example, where an insertion into the W (heating call) input port is mechanically sensed at initial startup, the VSCU unit 100 actuates the furnace (by coupling W to Rh) and then automatically monitors the temperature over a predetermined period, such as ten minutes. When the temperature is found to be rising over that predetermined period, then the VSCU determines that the W (heating call) lead has been properly connected to the W (heating call) input port. However, when the temperature is found to be falling over that predetermined period, then it is determined that Y (cooling call) lead has likely been erroneously connected to the W (heating call) input port. In one example, when such error is detected, the system is shut down and the user is notified and advised of the error on the circular display monitor 102. In another example, when such error is detected, the VSCU unit 100 automatically reassigns the W (heating call) input port as a Y (cooling call) input port to automatically correct the error. Similarly, according to an example, where the Y (cooling call) lead is mechanically sensed at initial startup, the VSCU unit 100 actuates the air conditioner (by coupling Y to Rc) and then automatically monitors the temperature, validating the Y connection when the temperature is sensed to be falling and invalidating the Y connection (and, optionally, automatically correcting the error by reassigning the Y input port as a W input port) when the temperature is sensed to be rising.

The VSCU may additionally determine a homeowner's pre-existing heat pump wiring convention when an insertion onto the O/B (heat pump) input port is mechanically sensed at initial startup. Depending on a combination of several factors, such as the history of the home, the geographical region of the home, and the particular manufacturer and installation year of the home's heat pump, there may be a different heat pump signal convention used with respect to the direction of operation (heating or cooling) of the heat pump. According to an example, the VSCU unit 100 automatically and systematically applies, for each of a number of preselected candidate heat pump actuation signal conventions, a cooling actuation command and a heating actuation command, each actuation command being followed by a predetermined time period over which the temperature change is sensed. If the cooling command according to the presently selected candidate convention is followed by a sensed period of falling temperature, and the heating command according to the presently selected candidate convention is followed by a sensed period of rising temperature, then the presently selected candidate convention is determined to be the actual heat pump signal convention for that home. If, on the other hand, the cooling command was not followed by a sensed period of cooling and/or the heating command was not followed by a sensed period of heating, then the presently selected candidate convention is discarded and the VSCU unit 100 repeats the process for the next candidate heat pump actuation signal convention.

Figure 8B:
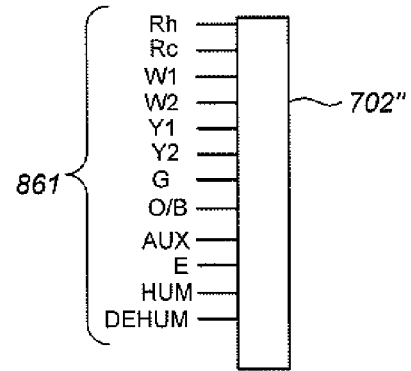

FIG. 8B illustrates a diagram of an HVAC-coupling wall dock 702", with particular reference to a set of input wiring ports 861, which represents a second version of the HVAC-coupling wall dock 702 of FIG. 7 that is manufactured and sold in a professional product package in conjunction with the VSCU unit 100. The professional product package is generally manufactured and marketed with professional installation in mind, such as by direct marketing to HVAC service companies, general contractors involved in the construction of new homes, or to homeowners having more complex HVAC systems with a recommendation for professional installation. The input wiring ports 861 of the HVAC-coupling wall dock 702" are selected to be sufficient to accommodate both simple and complex HVAC systems. In one example, the input wiring ports 861 include the following set: Rh (24 VAC heating call switch power); Rc (24VAC cooling call switch power); W1 (first stage heating call); W2 (second stage heating call); Y1 (first stage cooling call); Y2 (second stage cooling call); G (fan); O/B (heat pump); AUX (auxiliary device call); E (emergency heating call); HUM (humidifier call); and DEHUM (dehumidifier call). In one example, even though professional installation is contemplated, the HVAC-coupling wall dock 702" is nevertheless provided with small mechanical detection switches (not shown) at the respective input wiring ports for wire insertion sensing, and the VSCU unit 100 is provided with one or more of the various automated testing and automated configuration capabilities associated with the DIY package described above, which may be useful for some professional installers and/or more technically savvy do-it-yourselfers confident enough to perform the professional-model installation for their more advanced HVAC systems.

Figure 9:
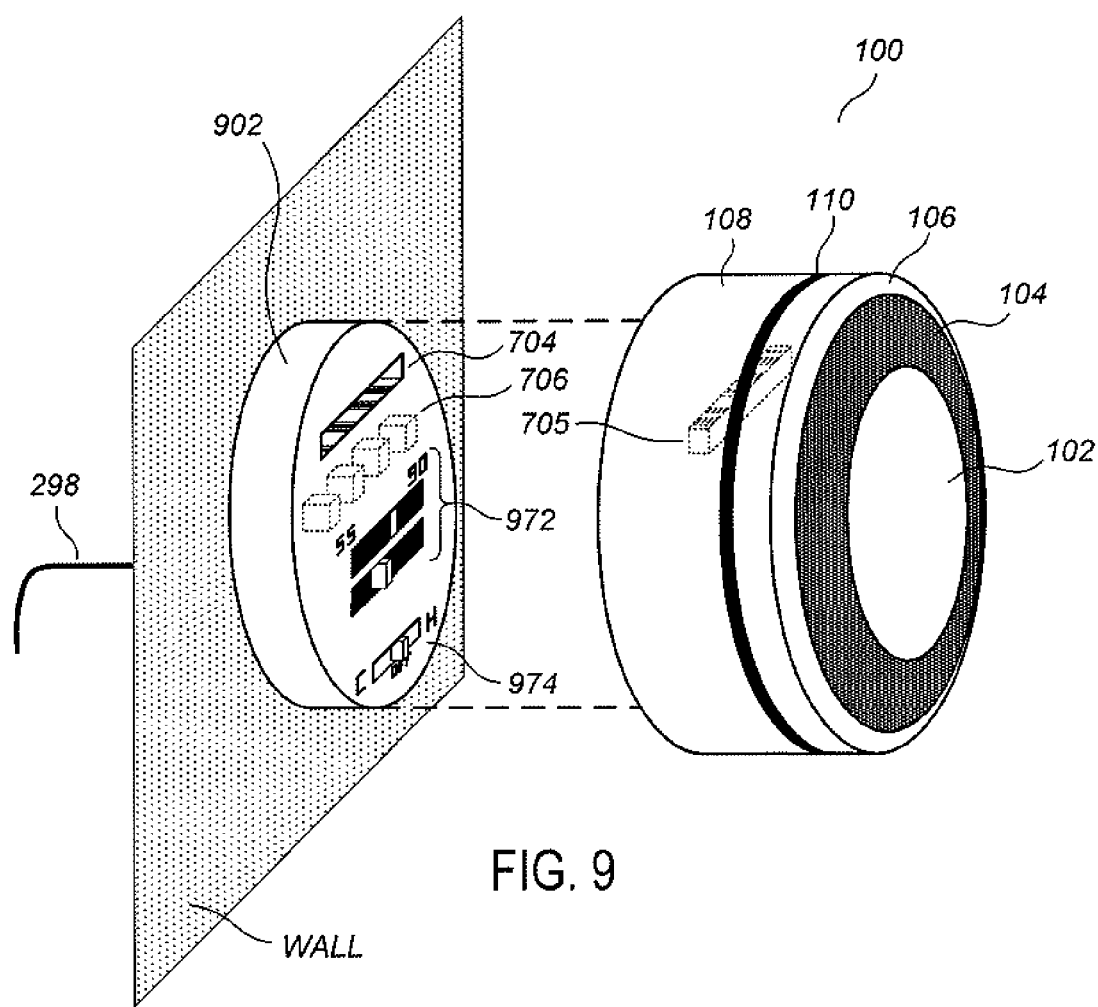
FIG. 9 illustrates an exploded perspective view of the VSCU unit and an HVAC-coupling wall dock.

FIG. 9 illustrates the VSCU unit and an HVAC-coupling wall dock. The HVAC-coupling wall dock 902 is similar to the HVAC-coupling wall dock 702 of FIG. 7, except that it has an additional functionality as a very simple, elemental, standalone thermostat when the VSCU unit 100 is removed, the elemental thermostat including a standard temperature readout/setting dial 972 and a simple COOL-OFF-HEAT switch 974. This can prove useful for a variety of situations, such as when the VSCU 100 needs to be removed for service or repair for an extended period of time over which the occupants would still like to remain reasonably comfortable. In one example, the elemental thermostat components 972 and 974 are entirely mechanical in nature, with no electrical power needed to trip the control relays. In other examples, simple electronic controls, such as electrical up/down buttons and/or an LCD readout, are provided. In other examples, some subset of the advanced functionalities of the VSCU unit 100 can be provided, such as elemental network access to allow remote control, to provide a sort of brain stem functionality while the brain (the VSCU unit 100) is temporarily away.

Figure 10A:
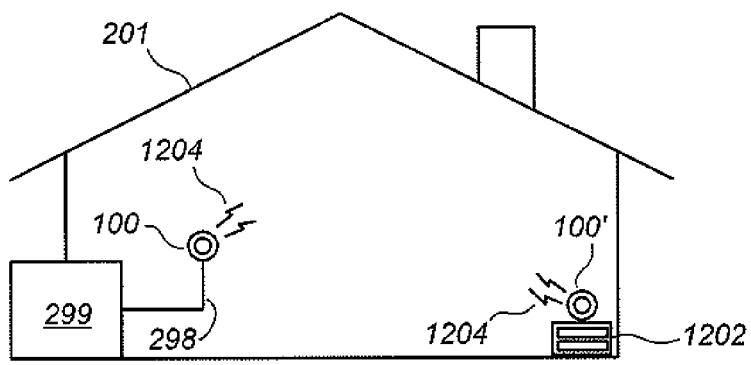
FIGS. 10A-10C illustrate conceptual diagrams representative of advantageous scenarios in which multiple VSCU units are installed in a home or other space that does not have a wireless data network.
Figure 10B:
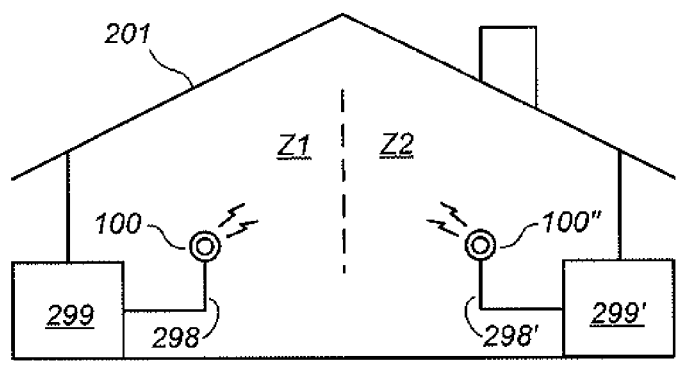
Figure 10C:
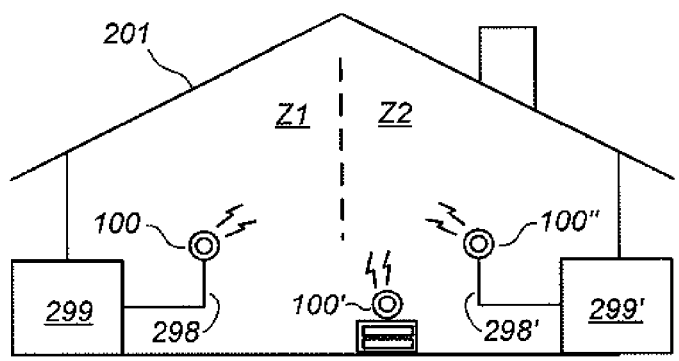

FIGS. 10A-10C illustrate conceptual diagrams representative of scenarios in which multiple VSCU units are installed in a home or other space that does not have a wireless data network. For the example of FIG. 10A in which the home 201 has a single HVAC system 298, a primary VSCU unit 100 is installed and connected to the HVAC system via the control wires 298 and an auxiliary VSCU unit 100' is placed, by way of example, on a nightstand 1202. The primary VSCU unit 100 and auxiliary VSCU unit 100' are each configured to automatically recognize the presence of the other and to communicate with each other using a wireless communication protocol such as Wi-Fi or ZigBee running in an ad hoc mode. Many advantageous capabilities are programmed into the VSCU units 100 and 100' to leverage their communication and multi-sensing capabilities that allow them, in a cooperative manner, to perform many VSCU unit functionalities, including learning about the home HVAC environment, performing occupancy sensing and prediction, learning user comfort preferences, etc., that do not require Internet access. In one example, the primary VSCU unit 100 receives temperature data from the auxiliary VSCU unit 100' and computes an average of the two temperatures, controlling the HVAC system 299 so that the average temperature of the home 201 is maintained at the current temperature set point level. One or more additional auxiliary VSCU units (not shown) may also be positioned at one or more additional locations throughout the home and can become part of the ad hoc home VSCU network. Among other advantages, adding more auxiliary VSCU units promotes more accurate occupancy detection, facilitates better determination of spatial temperature gradients and thermal characteristics, and provides additional data processing power.

The primary/auxiliary VSCU units 100/100' may be programmed to establish a master/slave relationship, in which any conflicts in their automated control determinations are resolved in favor of the master VSCU unit, and/or such that any user inputs at the master unit take precedence over any conflicting user inputs made at the slave VSCU unit. Although the primary VSCU unit 100 is likely the "master" VSCU unit in a beginning or default scenario, the status of any particular VSCU unit as a "master" or "slave" is not dictated solely by its status as a primary or auxiliary VSCU unit. Moreover, the status of any particular VSCU unit as "master" or "slave" is not permanent, but rather is dynamically established to best meet current HVAC control needs as can be best sensed and/or predicted by the VSCU units. In one example, the establishment of master versus slave status is optimized to best meet the comfort desires of users as can be best sensed and/or predicted by the VSCU units. By way of example, when each VSCU unit is sensing the presence of multiple occupants, then the primary VSCU unit is established as the master unit and controls the HVAC system 299 such that the average temperature reading of the two VSCU units is maintained at the current set point temperature according to a currently active template schedule (i.e., a schedule of time intervals and set point temperatures for each time interval). However, when no occupants in the home are sensed except for a person in the bedroom, as sensed by the auxiliary VSCU unit 100' which is positioned on a nightstand in this example, then the auxiliary VSCU unit 100' becomes the "master" VSCU unit, which commands the "slave" VSCU unit 100 to control the HVAC system 299 so that the temperature in the bedroom, as sensed by the master unit, stays at a current set point temperature.

Many other automated master/slave establishment scenarios and control determinations may be implemented. In one example, the master-slave determination can be made, influenced, and/or supported based on an automated determination of which thermostat is in the best location to reliably govern the temperature, based on historical and/or testing-observed cycling behavior or other criteria.

The establishment of master-slave status for the primary/auxiliary VSCU units 100/100' can also be based upon human control inputs. By way of example, when each VSCU unit is sensing the presence of multiple occupants, and a user manually changes the current set point temperature on one of the two units, the VSCU unit can output the question "Master Override?" on its circular display monitor 102 along with two answer options "Yes" and "Let VSCU Decide," with the latter being circled as the default response. On the other hand, when the two VSCUs collectively sense only the presence of one user in the home, then whichever unit is controlled by the user can be established as the master unit, without the need for asking the user for a resolution. The VSCU units 100/100' can be programmed so that the establishment of master/slave status can be explicitly dictated by a user at system setup time, such as during a setup interview, or at a subsequent configuration time using the menu-driven user interface of one of the two VSCU units.

Multiple VSCU units may share computing tasks among themselves in an optimal manner based on power availability and/or circuitry heating criteria. Many of the advanced sensing, prediction, and control algorithms provided with the VSCU unit are relatively complex and computationally intensive, and can result in high power usage and/or device heating when carried out unthrottled. In one example, the intensive computations are automatically distributed so that most are carried out on a subset of the VSCU units known to have the best power source(s) available at that time and/or known to have the highest amount of stored battery power available. Thus, for example, because it is generally preferable for each primary VSCU unit not to require household AC power for simplicity of installation as well as for equipment-safety concerns, the primary VSCU unit 100 of FIG. 10A is often powered by energy harvested from one or more of the 24 VAC call relay power signals, and therefore may only have a limited amount of extra power available for carrying out intensive computations. In contrast, a typical auxiliary VSCU unit may be a nightstand unit that can be plugged in as easily as a clock radio. In such cases, much of the computational load can be assigned to the auxiliary VSCU unit so that power is preserved in the primary VSCU unit. In another example, the speed of the intensive data computations carried out by the auxiliary VSCU unit (or, more generally, any VSCU unit to which the heavier computing load is assigned) can be automatically throttled using known techniques to avoid excessive device heating, so that temperature sensing errors in that unit are avoided. In yet another example, the temperature sensing functionality of the VSCU unit(s) to which the heavier computing load is assigned can be temporarily suspended for an interval that includes the duration of the computing time, so that no erroneous control decisions are made when substantial circuitry heating does occur.

Referring now to FIG. 10B, it is often the case that a home or business will have two or more HVAC systems, each of them being responsible for a different zone in the house and being controlled by its own thermostat. Thus, shown in FIG. 10B is a first HVAC system 299 associated with a first zone Z1 and a second HVAC system 299' associated with a second zone Z2. According to an example, first and second primary VSCU units 100 and 100'' are provided for controlling the respective HVAC units 299 and 299'. The first and second primary VSCU units 100 and 100'' are configured to leverage their communication and multi-sensing capabilities such that they jointly, in a cooperative manner, perform many cooperative communication-based VSCU unit functionalities similar or analogous to those described above with respect to FIG. 10A, and still further cooperative VSCU unit functionalities for multi-zone control. As illustrated in FIG. 10C, the cooperative functionality of the first and second primary VSCU units 100 and 100" can be further enhanced by the addition of one or more auxiliary VSCU units 100' according to further examples.

It is to be appreciated that there are other multiple-thermostat scenarios that exist in some homes other than ones for which each thermostat controls a distinct HVAC system, and that multiple VSCU unit installations can be configured to control such systems. In some existing home installations there may only be a single furnace or a single air conditioning unit, but the home may still be separated into multiple zones by actuated flaps in the ductwork, each zone controlled by its own thermostat. In such settings, two primary VSCU units can be installed and configured to cooperate, optionally in conjunction with one or more auxiliary VSCU units, to provide optimal HVAC system control according to the described examples.

In one example in the context of non-network-connected VSCU units, the VSCU unit is configured and programmed to use optically sensed information to determine an approximate time of day. For a large majority of installations, regardless of the particular location of installation in the home, there is generally a cyclical 24-hour pattern related to the intensity of ambient light detected by a VSCU unit. This cyclical 24-hour pattern is automatically sensed, with spurious optical activity such as light fixture actuations being filtered out over many days or weeks when necessary, and optionally using ZIP code information, to establish a rough estimate of the actual time of day. This rough internal clock can be used for non-network-connected installations to verify and correct a gross clock setting error by the user or to establish a time-of-day clock when the user does not enter a time during configuration.

Figure 11:
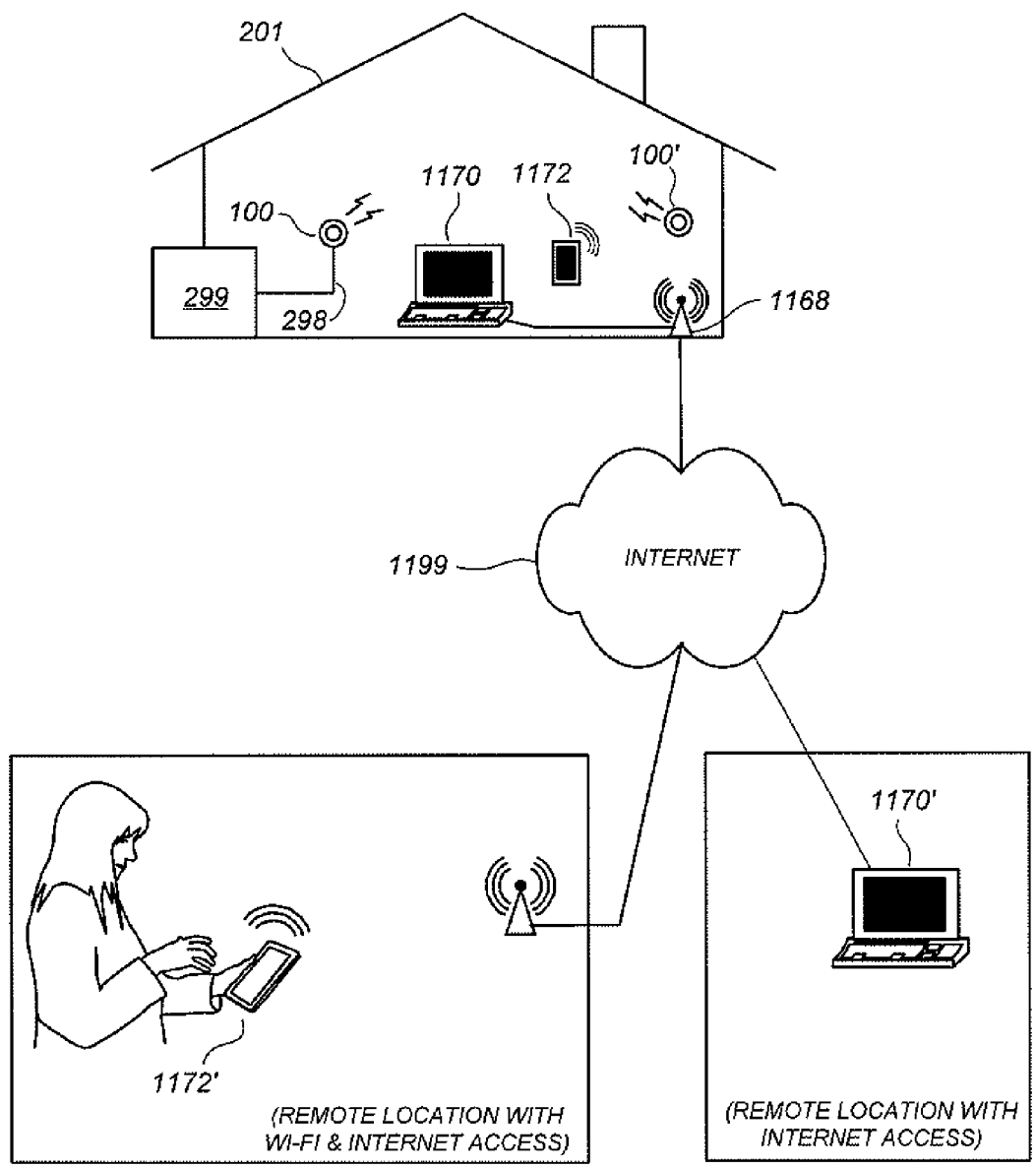
FIG. 11 illustrates an advantageous scenario in which one or more VSCU units are installed in a home that is equipped with WiFi wireless connectivity and access to the Internet.

FIG. 11 illustrates a scenario in which one or more VSCU units are installed in a home that is equipped with WiFi wireless connectivity and access to the Internet. In addition to providing the standalone, non-Internet connected functionalities described for FIGS. 10A-10C, the connection of one or more VSCU units to the Internet allows the VSCUs to provide a rich variety of additional capabilities. Shown in FIG. 11 is a primary VSCU unit 100 and auxiliary VSCU unit 100' having WiFi access to the Internet 1199 via a wireless router/Internet gateway 1168. A user may communicate with the VSCU units 100 and/or 100' via a home computer 1170, a smart phone 1172 or other portable data communication appliance 1172', or any other Internet-connected computer 1170'.

Figure 12:
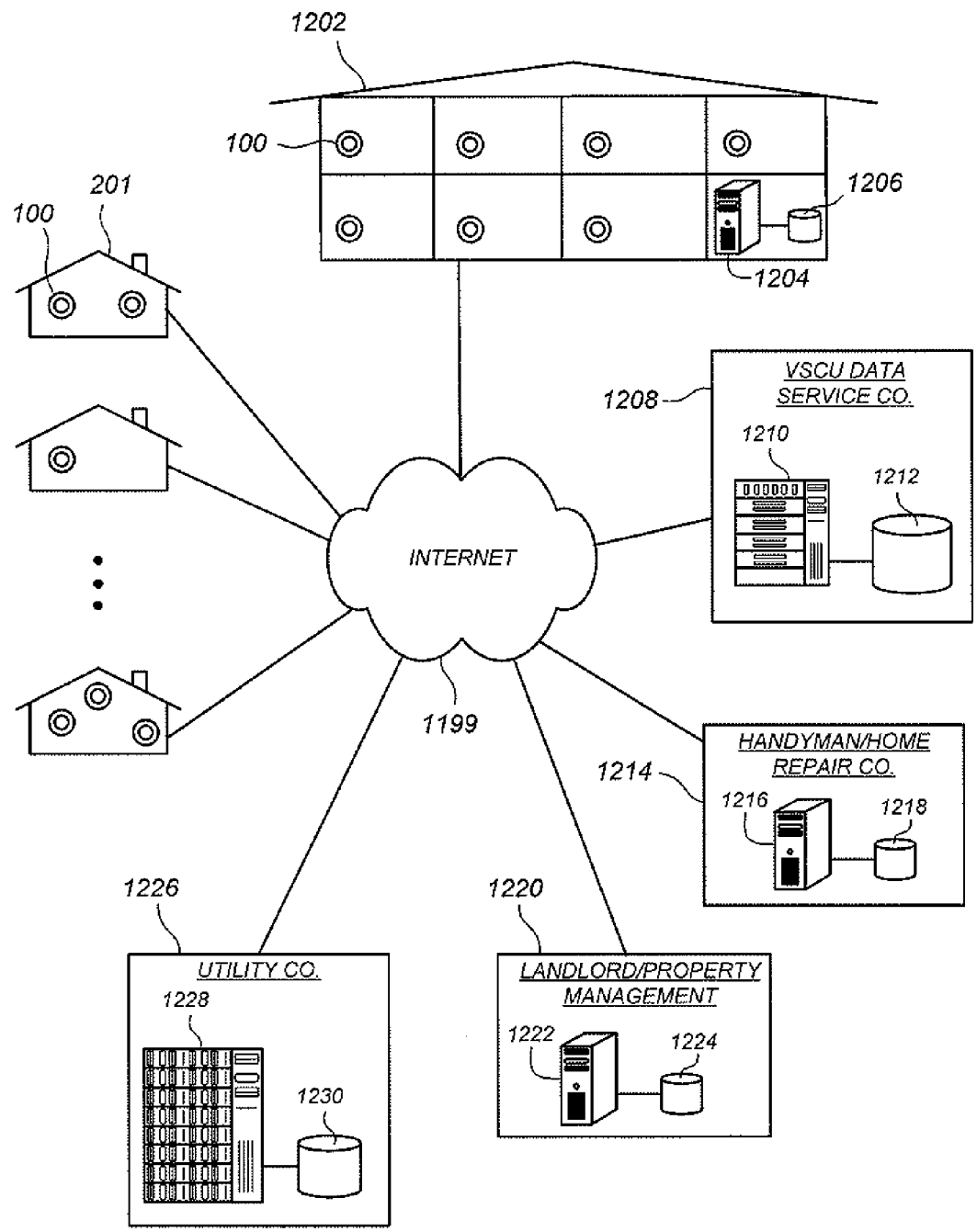
FIG. 12 illustrates an energy management network as enabled by the VSCU units and VSCU Efficiency Platform.

FIG. 12 illustrates an energy management network as enabled by the VSCU units and VSCU Efficiency Platform. The environment of FIG. 12, which is applicable on any scale (neighborhood, regional, state-wide, country-wide, and even world-wide), includes: a number of homes 201 each having one or more network-enabled VSCU units 100; an exemplary hotel 1202 (or multi-unit apartment building, etc.) in which each room or unit has a VSCU unit 100, the hotel 1202 further having a computer system 1204 and database 1206 configured for managing the multiple VSCU units and running software programs, or accessing cloud-based services, provisioned and/or supported by the VSCU data service company 1208; a VSCU data service company 1208 having computing equipment 1210 and database equipment 1212 configured for facilitating provisioning and management of VSCU units, VSCU support equipment, and VSCU-related software and subscription services; a handyman or home repair company 1214 having a computer 1216 and database 1218 configured, for example, to remotely monitor and test VSCU operation and automatically trigger dispatch tickets for detected problems, the computer 1216 and database 1218 running software programs or accessing cloud-based services provisioned and/or supported by the VSCU data service company 1208; a landlord or property management company 1220 having a computer 1222 and database 1224 configured, for example, to remotely monitor and/or manage the VSCU operation of their tenants and/or clients, the computer 1222 and database 1224 running software programs, or accessing cloud-based services, provisioned and/or supported by the VSCU data service company 1208; and a utility company 1226 providing HVAC energy to utility customers and having computing equipment 1228 and database equipment 1230 for monitoring VSCU unit operation, providing VSCU-usable energy usage data and statistics, and managing and/or controlling VSCU unit set points at peak load times or other times, the computing equipment 1228 and database equipment 1230 running software programs or accessing cloud-based services provisioned and/or supported by the VSCU data service company 1208.

According to one example, each VSCU unit provides external data access at two different functionality levels, one for user-level access with energy and home-management functionality, and another for an installer/vendor ("professional") that lets the professional monitor a user's system, look at all the different remote sensing gauges, and offer to provide and/or automatically provide a user with a service visit.

Figure 13A:
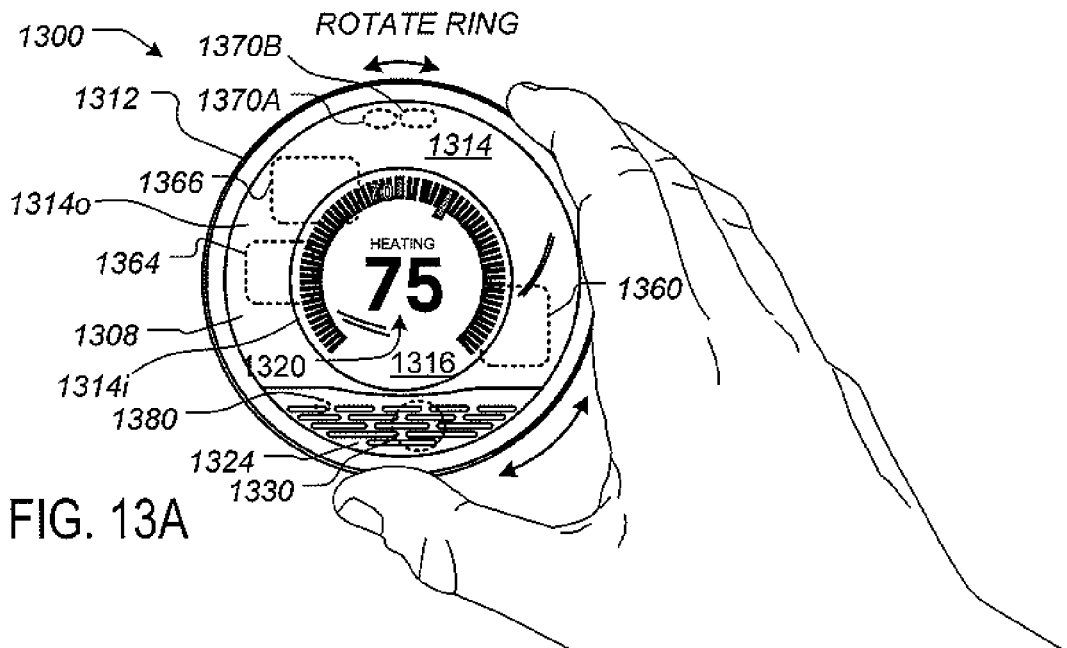
FIGS. 13A-B illustrate a thermostat having a user-friendly interface.
Figure 13B:
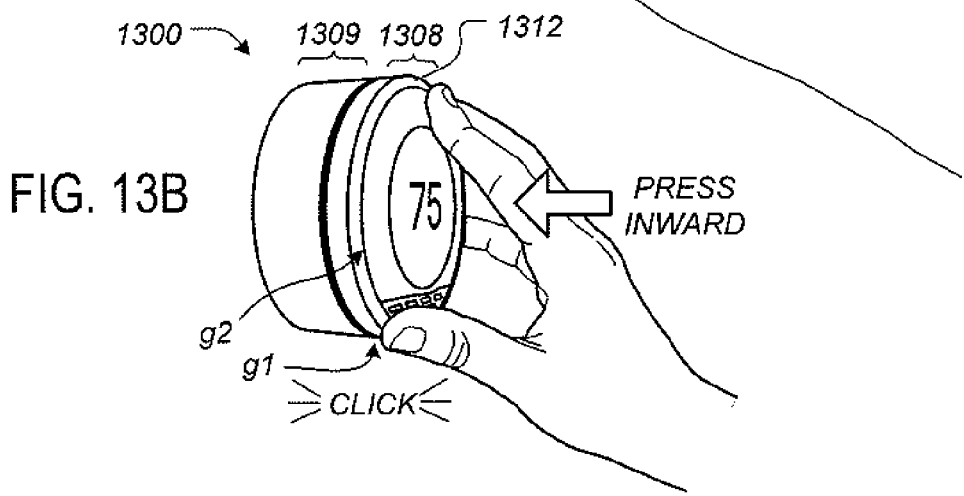

FIGS. 13A-B illustrate a thermostat having a user-friendly interface. The term "thermostat" is used below to refer to a VSCU unit (Versatile Sensing and Control) that is particularly applicable for HVAC control in an enclosure. Unlike many prior art thermostats, thermostat 1300 has a sleek, simple, uncluttered and elegant design. Moreover, user interaction with thermostat 1300 is facilitated and greatly enhanced over known conventional thermostats by the design of thermostat 1300. The thermostat 1300 includes control circuitry and is electrically connected to an HVAC system, such as is shown with thermostat 110 in FIGS. 1 and 2. Thermostat 1300 is wall mounted, is circular in shape, and has an outer rotatable ring 1312 for receiving user input. Thermostat 1300 has a large front face lying inside the outer ring 1312. According to some examples, thermostat 1300 is approximately 80 mm in diameter. The outer rotatable ring 1312 allows the user to make adjustments, such as selecting a new target temperature. For example, by rotating the outer ring 1312 clockwise, the target temperature can be increased, and by rotating the outer ring 1312 counter-clockwise, the target temperature can be decreased. The front face of the thermostat 1300 comprises a clear cover 1314 that according to some examples is polycarbonate, and a metallic portion 1324 having a number of slots. According to some examples, the surface of cover 1314 and metallic portion 1324 form a common outward arc or spherical shape gently arcing outward, and this gentle arcing shape is continued by the outer ring 1312.

Although being formed from a single lens-like piece of material, such as polycarbonate, the cover 1314 has two different regions or portions including an outer portion 1314o and a central portion 1314i. According to some examples, the cover 1314 is painted or smoked around the outer portion 1314o, but leaves the central portion 1314i visibly clear so as to facilitate viewing of an electronic display 1316. According to some examples, the curved cover 1314 acts as a lens that tends to magnify the information being displayed in electronic display 1316 to users. An example of information displayed on the electronic display 1316 is illustrated in FIG. 13A, and includes central numerals 1320 that are representative of a current set point temperature. According to some examples, metallic portion 1324 has number of slot-like openings so as to facilitate the use of a passive infrared motion sensor 1330. The metallic portion 1324 can alternatively be termed a metallic front grille portion. The thermostat 1300 is generally constructed so that the electronic display 1316 is at a fixed orientation and does not rotate with the outer ring 1312. In some examples, the cover 1314 and metallic portion 1324 also remain at a fixed orientation and do not rotate with the outer ring 1312. According to one example in which the diameter of the thermostat 1300 is about 80 mm, the diameter of the electronic display 1316 is about 45 mm. According to some examples an LED indicator 1380 is positioned beneath portion 1324 to act as a low-power-consuming indicator of certain status conditions. For, example the LED indicator 1380 can be used to display blinking red when a rechargeable battery of the thermostat is very low and is being recharged. More generally, the LED indicator 1380 can be used for communicating one or more status codes or error codes by virtue of red color, green color, various combinations of red and green, various different blinking rates, and so forth, which can be useful for troubleshooting purposes.

Motion sensing as well as other techniques can be use used in the detection and/or predict of occupancy. According to some examples, occupancy information is used in generating an effective and efficient scheduled program. Preferably, an active proximity sensor 1370A is provided to detect an approaching user by infrared light reflection, and an ambient light sensor 1370B is provided to sense visible light. The proximity sensor 1370A can be used to detect proximity in the range of about one meter so that the thermostat 1300 can initiate wake-up functionality when the user is approaching the thermostat and prior to the user touching the thermostat. Such use of proximity sensing is useful for enhancing the user experience by readying the thermostat for interaction as soon as, or very soon after the user is ready to interact with the thermostat. Further, the wake-up-on-proximity functionality also allows for energy savings within the thermostat by sleeping when no user interaction is taking place our about to take place. The ambient light sensor 1370B can be used for a variety of intelligence-gathering purposes, such as for facilitating confirmation of occupancy when sharp rising or falling edges are detected (because it is likely that there are occupants who are turning the lights on and off) and for detecting long patterns of ambient light intensity for confirming and/or automatically establishing the time of day.

The thermostat 1300 is controlled by only two types of user input, the first being a rotation of the outer ring 1312 as shown in FIG. 13A, and the second being an inward push on an outer cap 1308 (see FIG. 13B) until an audible and/or tactile click occurs. For the example of FIGS. 13A-13B, the outer cap 1308 is an assembly that includes all of the outer ring 1312, cover 1314, electronic display 1316, and metallic portion 1324. When pressed inwardly by the user, the outer cap 1308 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound. Thus, for the example of FIGS. 13A-13B, an inward click can be achieved by direct pressing on the outer ring 1312 itself, or by indirect pressing of the outer ring by virtue of providing inward pressure on the cover 1314, metallic portion 1314, or by various combinations thereof. In other examples, the thermostat 1300 can be mechanically configured so that only the outer ring 1312 travels inwardly for the inward click input, while the cover 1314 and metallic portion 1324 remain motionless. It has been found desirable to provide the user with an ability to quickly go back and forth between registering ring rotations and inward clicks with a single hand and with minimal amount of time and effort involved. The strategic placement of the electronic display 1316 centrally inside the rotatable ring 1312 allows the user to focus his or her attention on the electronic display throughout the input process.

Figure 13C:
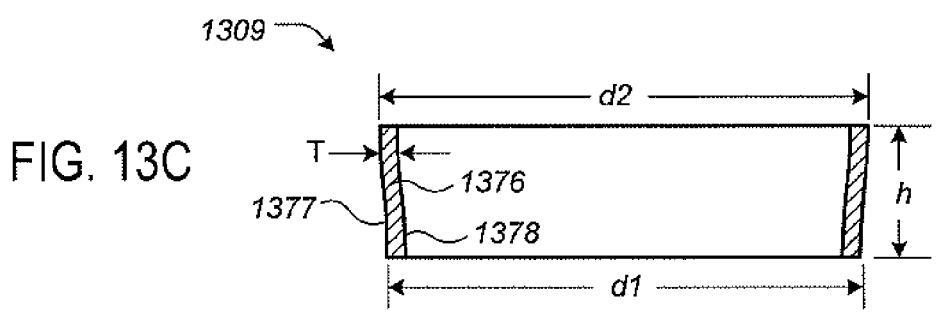
FIG. 13C illustrates a shell portion of a frame of the thermostat of FIGS. 13A-B.

FIG. 13C illustrates a shell portion of a frame of the thermostat of FIGS. 13A-B. While the thermostat functionally adapts to the user's schedule, the outer shell portion 1309 is specially configured to convey a chameleon quality or characteristic so that the overall device appears to naturally blend in with many of the most common wall colors and wall textures found in home and business environments, at least in part because it will appear to assume the surrounding colors and even textures when viewed from many different angles. The shell portion 1309 has the shape of a frustum that is gently curved when viewed in cross-section, and comprises a sidewall 1376 that is made of a clear solid material, such as polycarbonate plastic. The sidewall 1376 is backpainted with a substantially flat silver- or nickel-colored paint, the paint being applied to an inside surface 1378 of the sidewall 1376 but not to an outside surface 1377. The outside surface 1377 is smooth and glossy but is not painted. The sidewall 1376 can have a thickness T of about 1.5 mm, a diameter d1 of about 78.8 mm at a first end that is nearer to the wall when mounted, and a diameter d2 of about 81.2 mm at a second end that is farther from the wall when mounted, the diameter change taking place across an outward width dimension h of about 22.5 mm, the diameter change taking place in either a linear fashion or, more preferably, a slightly nonlinear fashion with increasing outward distance to form a slightly curved shape when viewed in profile, as shown in FIG. 13C. The outer ring 1312 of outer cap 1308 is preferably constructed to match the diameter d2 where disposed near the second end of the shell portion 1309 across a modestly sized gap g1 therefrom, and then to gently arc back inwardly to meet the cover 1314 across a small gap g2.

According to some examples, the thermostat 1300 includes a processing system 1360, display driver 1364 and a wireless communications system 1366. The processing system 1360 is adapted to cause the display driver 1364 and display area 1316 to display information to the user, and to receiver user input via the rotatable ring 1312. The processing system 1360, according to some examples, is capable of carrying out the governance of the operation of thermostat 1300 including the user interface features. The processing system 1360 is further programmed and configured to carry out other operations as described further below and/or in other ones of the commonly assigned incorporated applications. For example, processing system 1360 is further programmed and configured to maintain and update a thermodynamic model for the enclosure in which the HVAC system is installed. According to some examples, the wireless communications system 1366 is used to communicate with devices such as personal computers and/or other thermostats or HVAC system components, which can be peer-to-peer communications, communications through one or more servers located on a private network, or and/or communications through a cloud-based service.

Figure 14A:
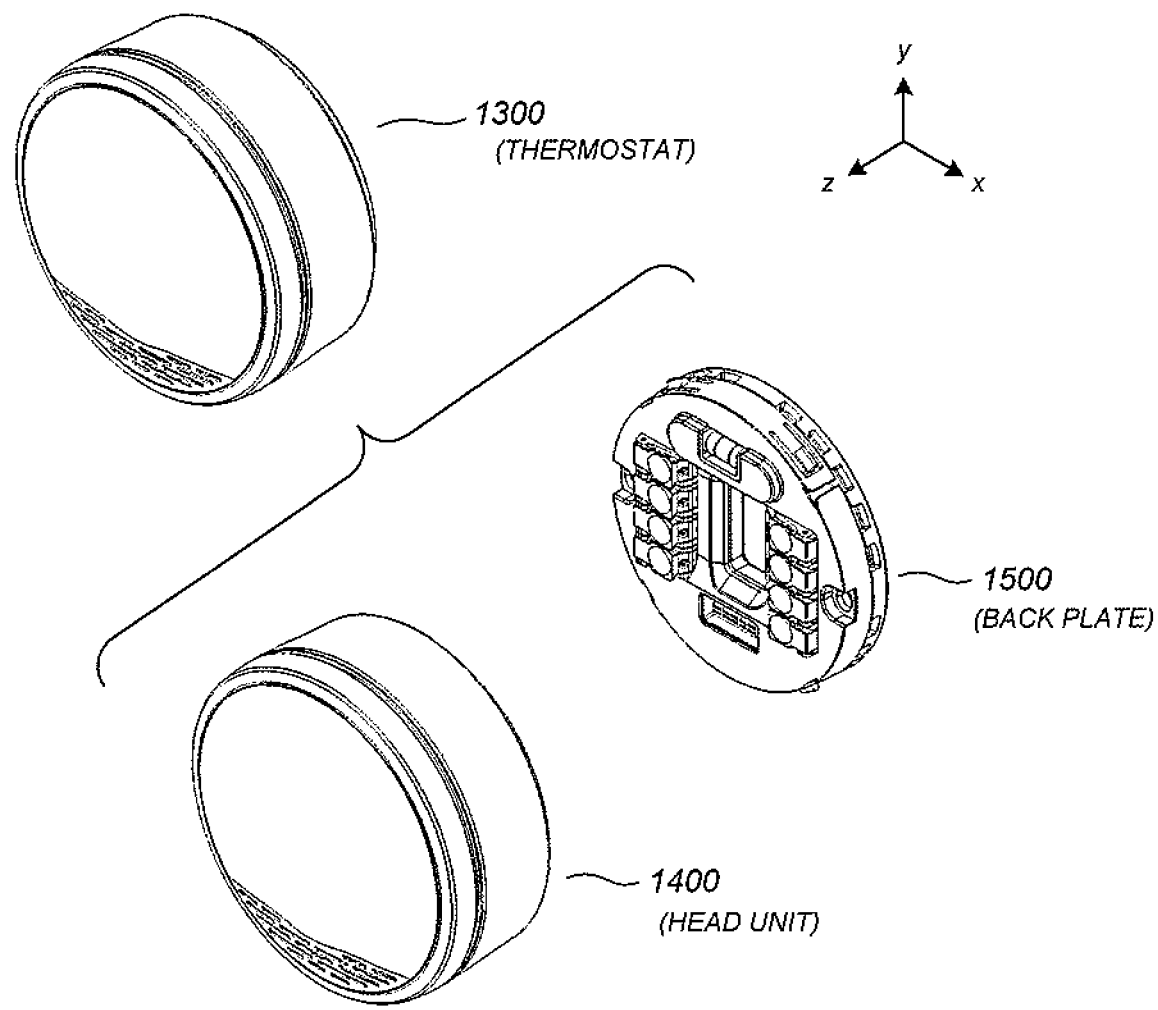
FIGS. 14A-14B illustrate a thermostat with respect to its two main components: the head unit and the back plate.
Figure 14B:
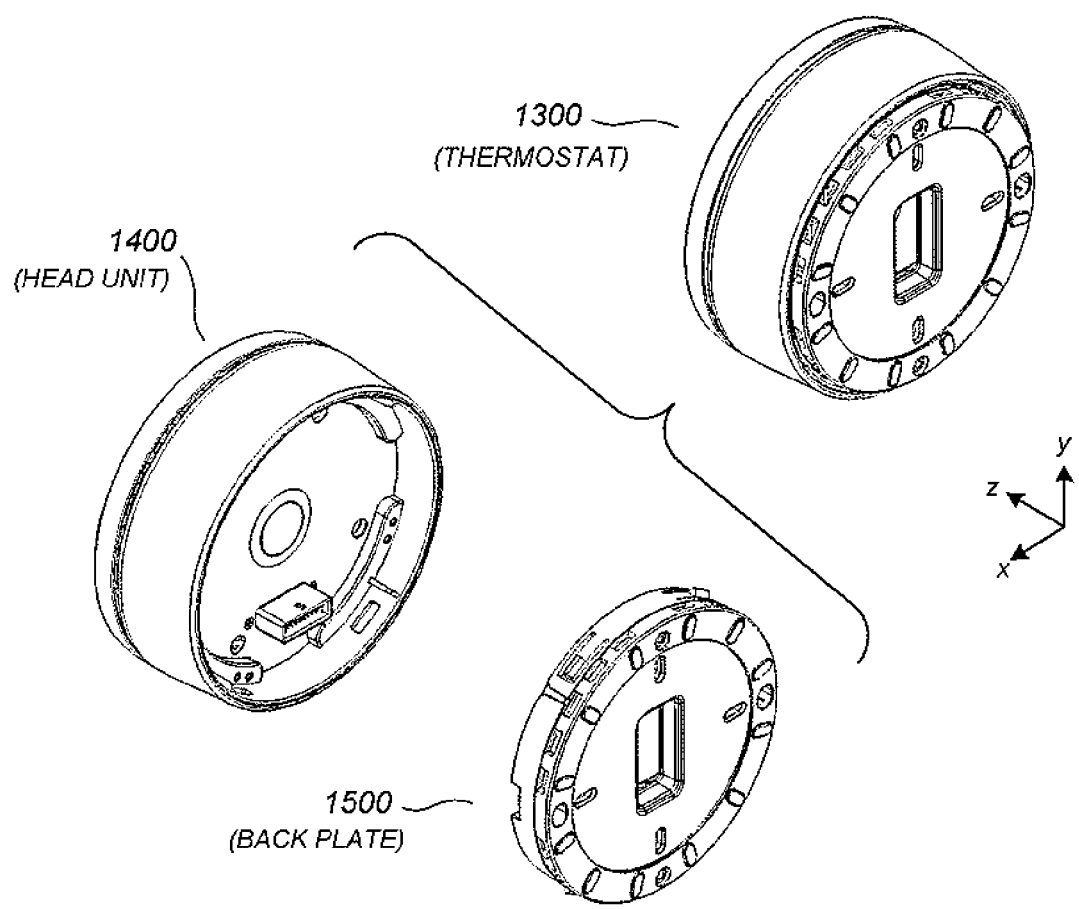

FIGS. 14A-14B illustrate a thermostat with respect to its two main components: the head unit and the back plate. The thermostat 1300 includes head unit 1400 and back plate 1500. In the drawings shown, the "z" direction is outward from the wall, the "y" direction is the head-to-toe direction relative to a walk-up user, and the "x" direction is the user's left-to-right direction.

Figure 15A:
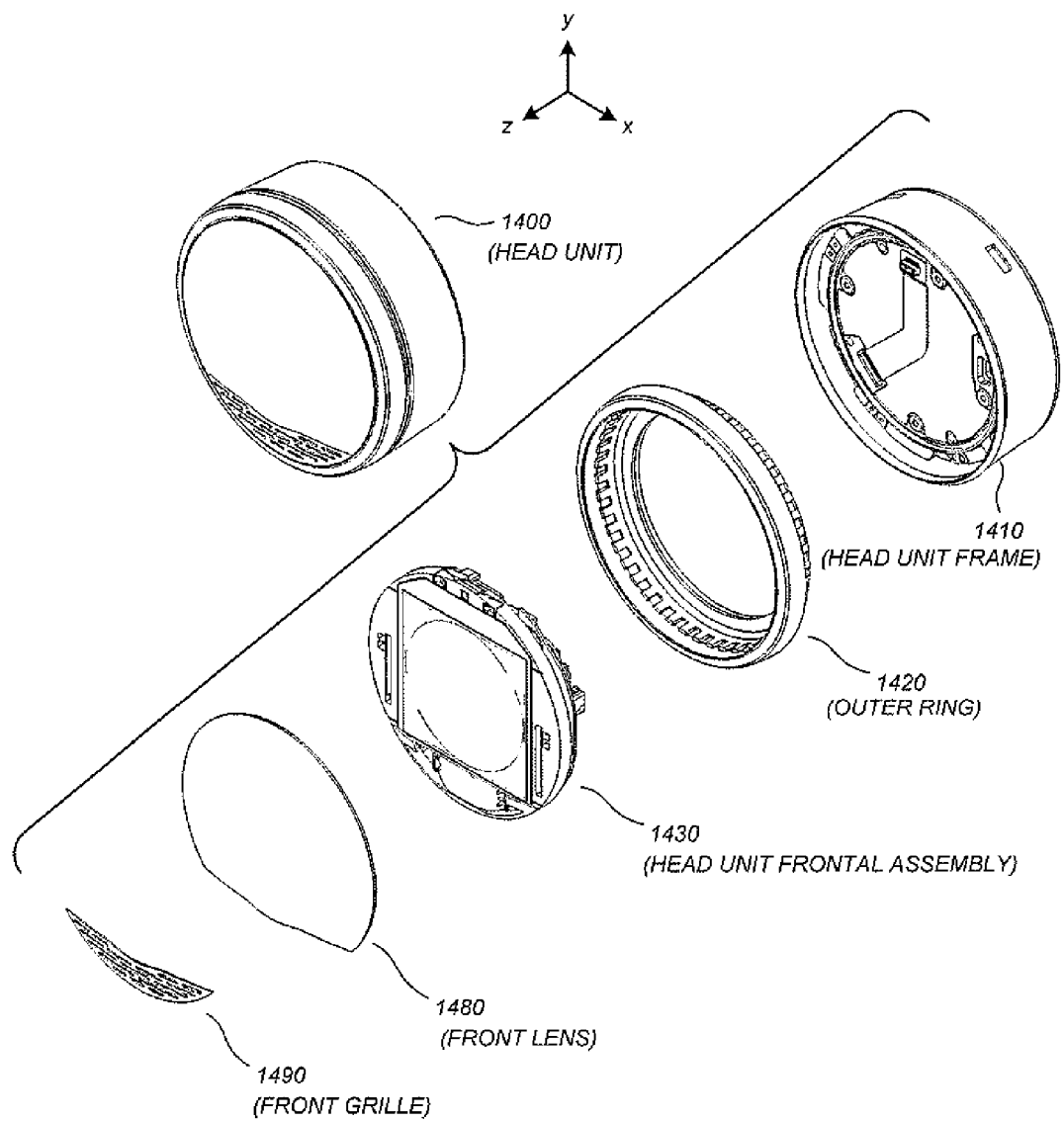
FIGS. 15A-15B illustrate the head unit with respect to its primary components.
Figure 15B:
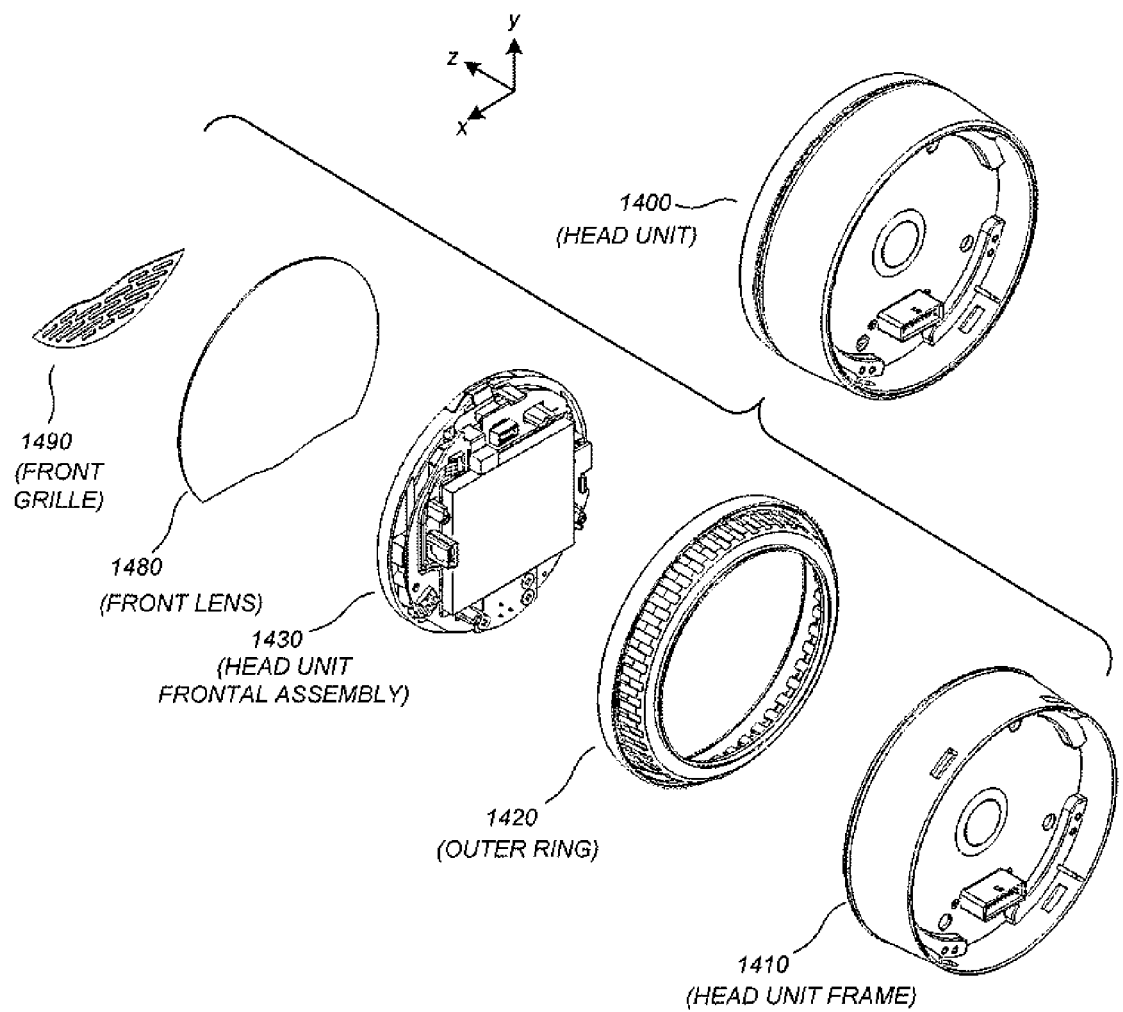

FIGS. 15A-15B illustrate the head unit with respect to its primary components. Head unit 1400 includes a head unit frame 1410, the outer ring 1420 (which is manipulated for ring rotations), a head unit frontal assembly 1430, a front lens 1480, and a front grille 1490. Electrical components on the head unit frontal assembly 1430 can connect to electrical components on the backplate 1500 by virtue of ribbon cables and/or other plug type electrical connectors.

Figure 16A:
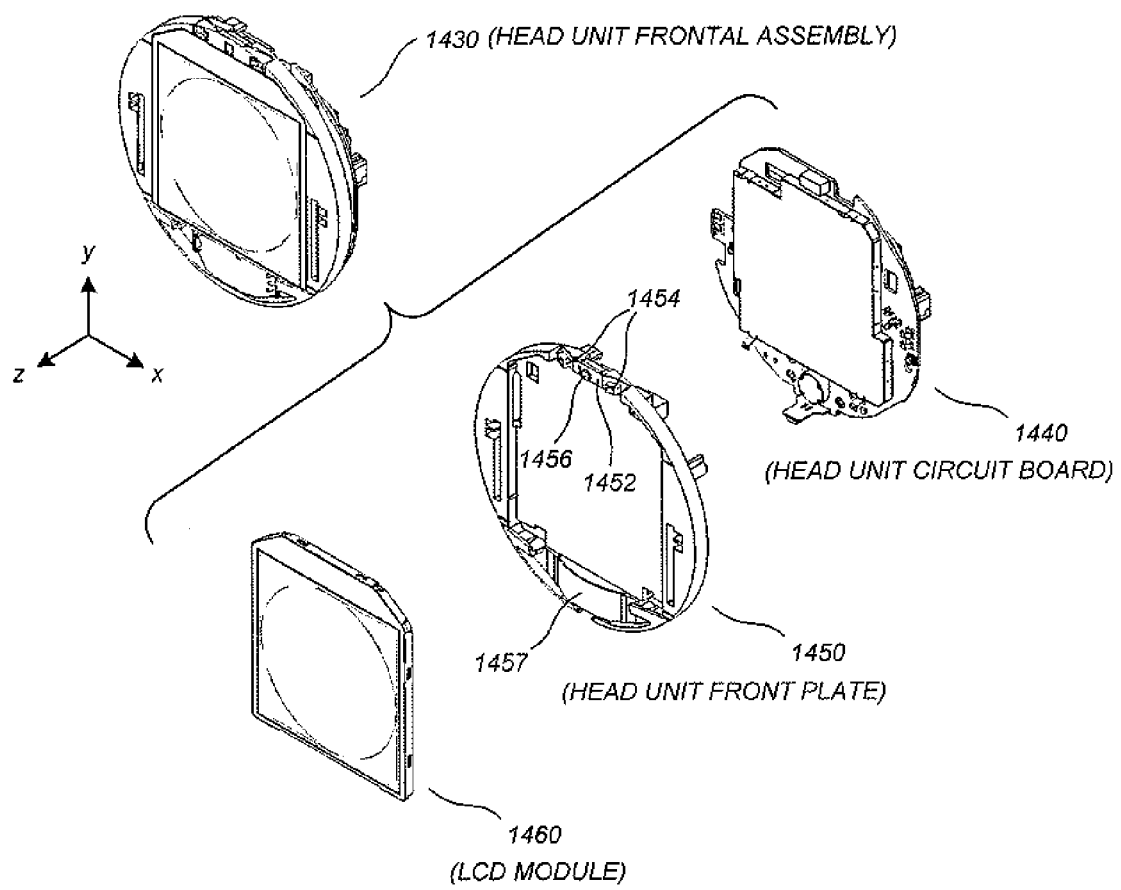
FIGS. 16A-16B illustrate the head-unit frontal assembly with respect to its primary components.
Figure 16B:
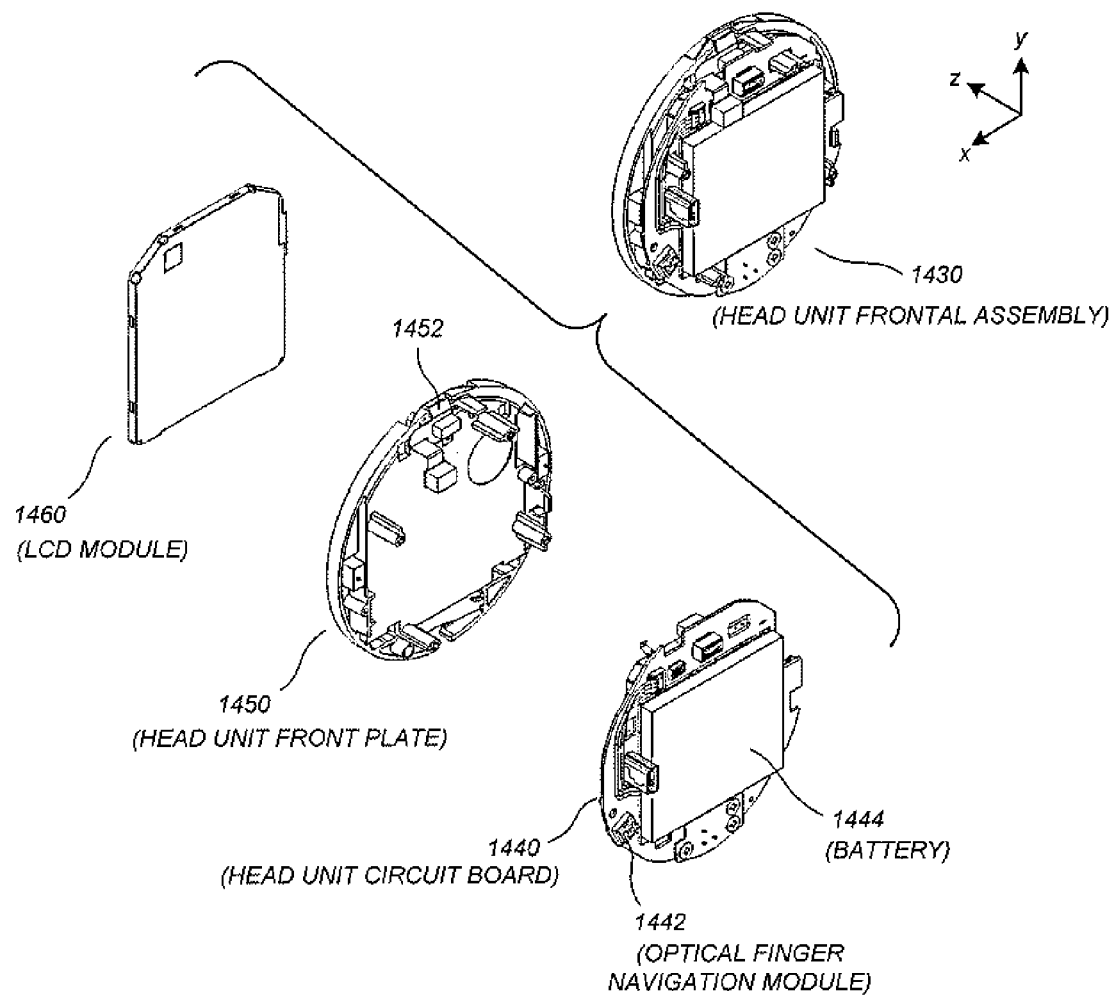

FIGS. 16A-16B illustrate the head-unit frontal assembly with respect to its primary components. Head unit frontal assembly 1430 comprises a head unit circuit board 1440, a head unit front plate 1450, and an LCD module 1460. The components of the front side of head unit circuit board 1440 are hidden behind an RF shield in FIG. 16A but are discussed in more detail below with respect to FIG. 19. On the back of the head unit circuit board 1440 is a rechargeable Lithium-Ion battery 1444, which for one preferred example has a nominal voltage of 3.7 volts and a nominal capacity of 560 mAh. To extend battery life, however, the battery 1444 is normally not charged beyond 450 mAh by the thermostat battery charging circuitry. Moreover, although the battery 1444 is rated to be capable of being charged to 4.2 volts, the thermostat battery charging circuitry normally does not charge it beyond 3.95 volts. Also visible in FIG. 16B is an optical finger navigation module 1442 that is configured and positioned to sense rotation of the outer ring 1420. The module 1442 uses methods analogous to the operation of optical computer mice to sense the movement of a texturable surface on a facing periphery of the outer ring 1420. Notably, the module 1442 is one of the very few sensors that are controlled by the relatively power-intensive head unit microprocessor rather than the relatively low-power backplate microprocessor. This is achievable without excessive power drain implications because the head unit microprocessor will be awake when the user is manually turning the dial, so there is no excessive wake-up power drain. Very fast response can also be provided by the head unit microprocessor. Also visible in FIG. 16A is a Fresnel lens 1457 that operates in conjunction with a PIR motion sensor.

Figure 17A:
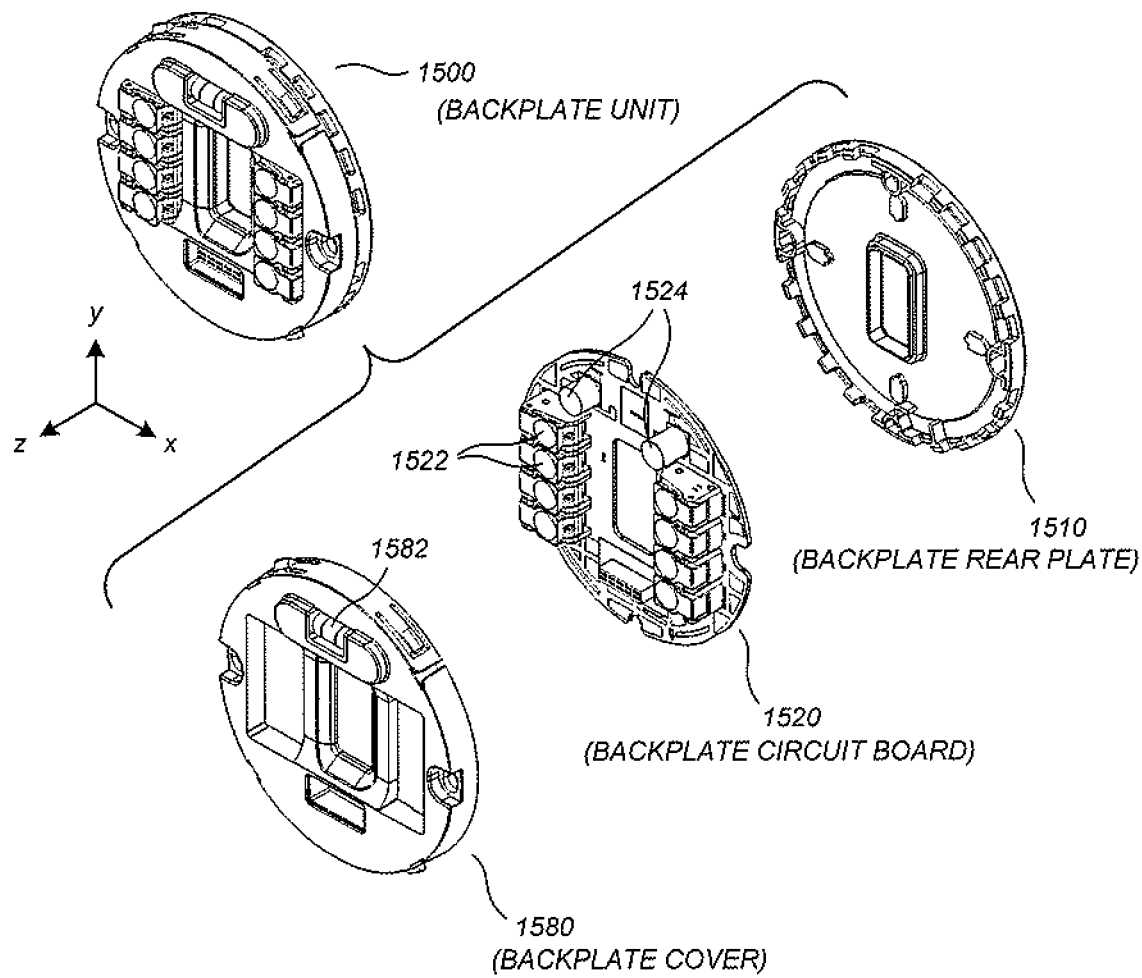
FIGS. 17A-17B illustrate the backplate unit with respect to its primary components.
Figure 17B:
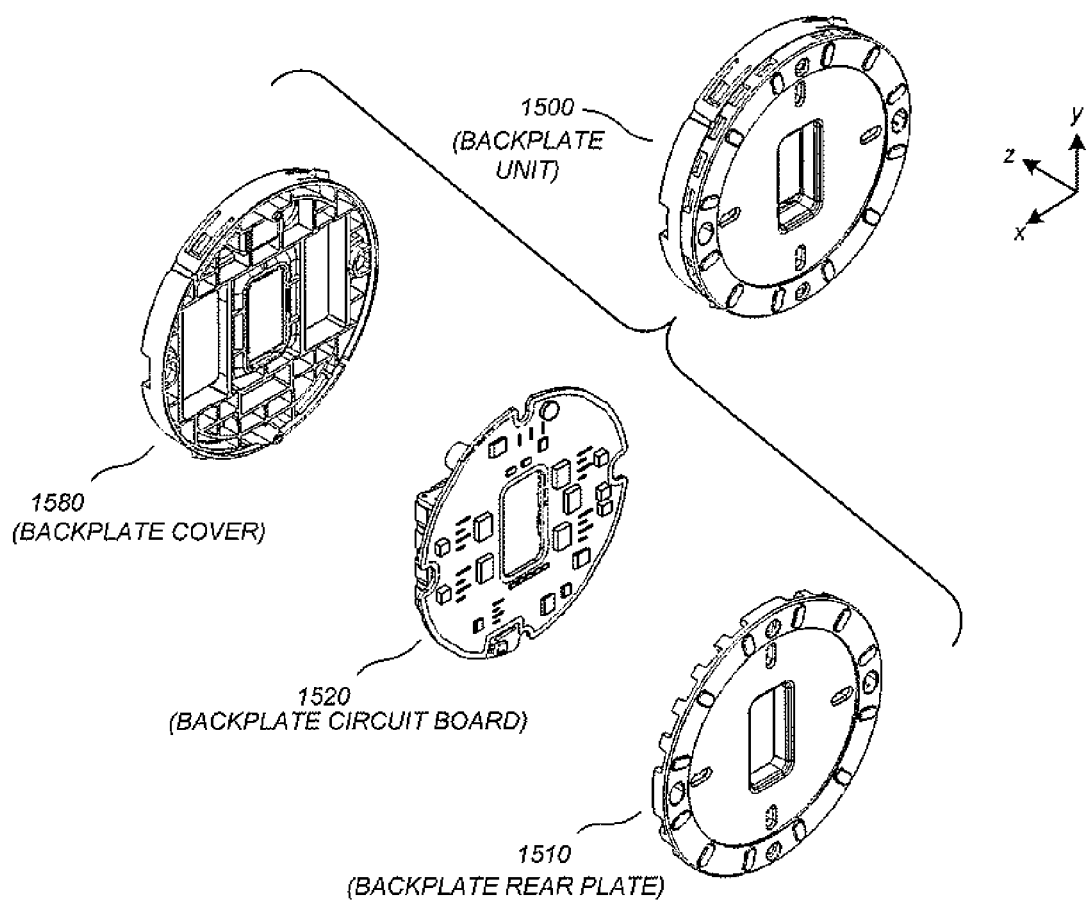

FIGS. 17A-17B illustrate the backplate unit with respect to its primary components. Backplate unit 1500 comprises a backplate rear plate 1510, a backplate circuit board 1520, and a backplate cover 1580. Visible in FIG. 17A are the HVAC wire connectors 1522 that include integrated wire insertion sensing circuitry, and two relatively large capacitors 1524 that are used by part of the power stealing circuitry that is mounted on the back side of the backplate circuit board 1520 and discussed further below with respect to FIG. 20.

Figure 18:
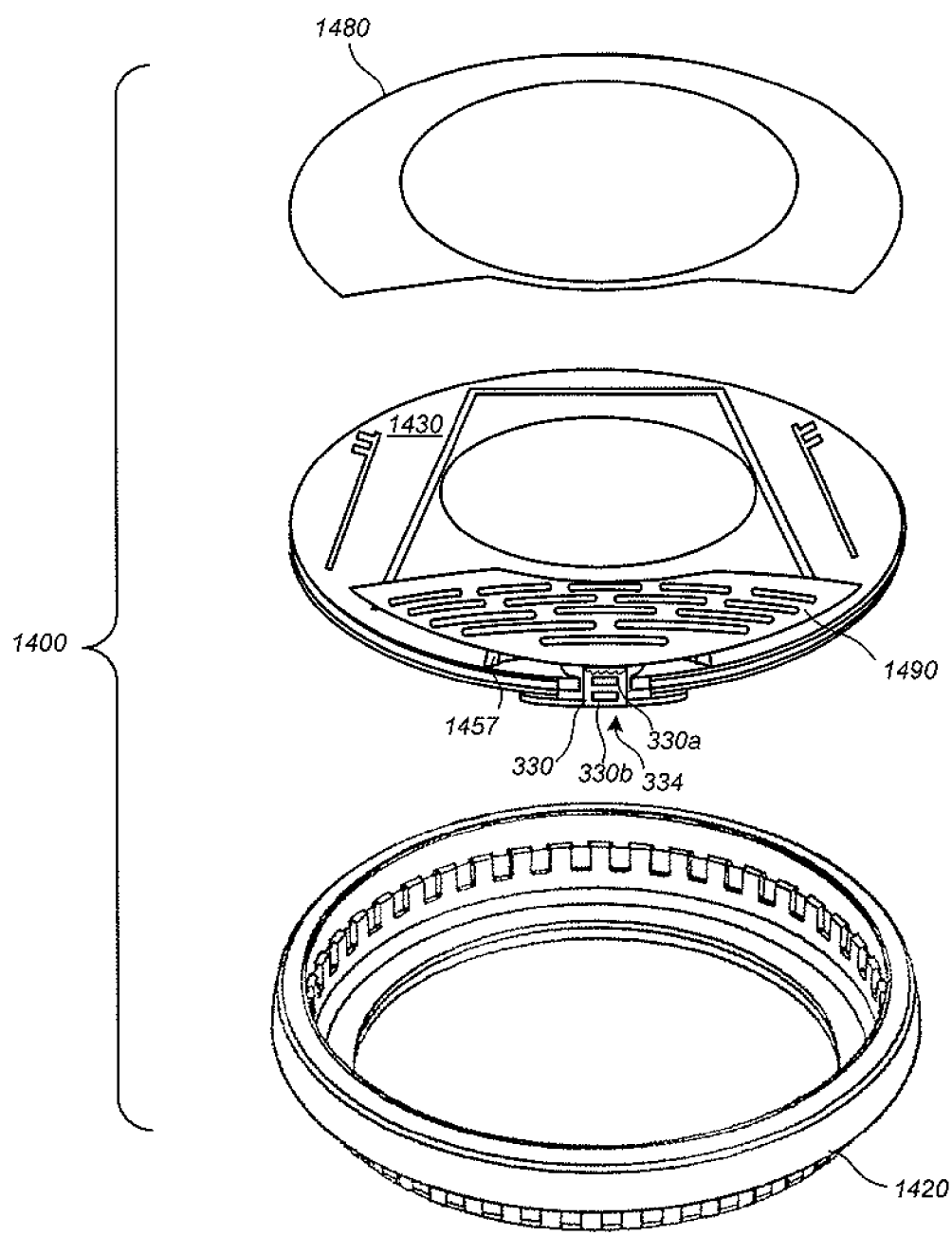
FIG. 18 a partially assembled head-unit front.

FIG. 18 a partially assembled head-unit front. FIG. 18 shows the positioning of grille member 1490 designed in accordance with aspects of the present invention with respect to several sensors used by the thermostat. In some implementations, placement of grille member 1490 over the Fresnel lens 1457 and an associated PIR motion sensor 334 conceals and protects these PIR sensing elements, while horizontal slots in the grille member 1490 allow the PIR motion sensing hardware, despite being concealed, to detect the lateral motion of occupants in a room or area. A temperature sensor 330 uses a pair of thermal sensors to more accurately measure ambient temperature. A first or upper thermal sensor 330a associated with temperature sensor 330 tends to gather temperature data closer to the area outside or on the exterior of the thermostat while a second or lower thermal sensor 330b tends to collect temperature data more closely associated with the interior of the housing. In one implementation, each of the temperature sensors 330a and 330b comprises a Texas Instruments TMP112 digital temperature sensor chip, while the PIR motion sensor 334 comprises PerkinElmer DigiPyro PYD 1498 dual element pyrodetector.

To more accurately determine the ambient temperature, the temperature taken from the lower thermal sensor 330b is taken into consideration in view of the temperatures measured by the upper thermal sensor 330a and when determining the effective ambient temperature. This configuration can be used to compensate for the effects of internal heat produced in the thermostat by the microprocessor(s) and/or other electronic components, obviating or minimizing temperature measurement errors that might otherwise be suffered. In some implementations, the accuracy of the ambient temperature measurement may be further enhanced by thermally coupling upper thermal sensor 330a of temperature sensor 330 to grille member 1490 as the upper thermal sensor 330a better reflects the ambient temperature than lower thermal sensor 334b.

Figure 19:
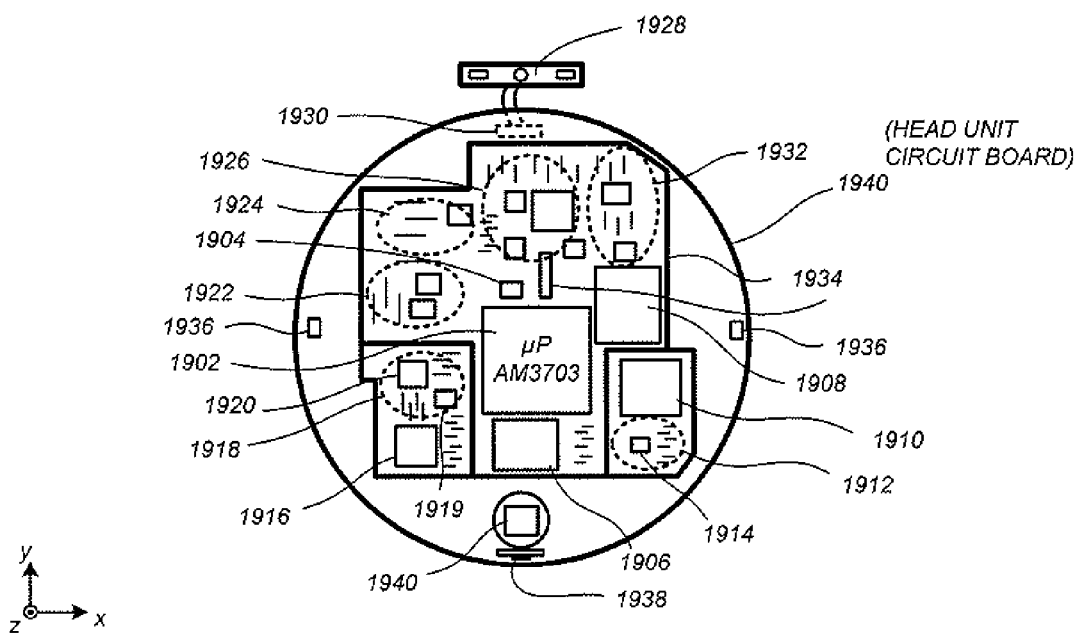
FIG. 19 illustrates a head-on view of the head-unit circuit board.

FIG. 19 illustrates a head-on view of the head-unit circuit board. The head unit circuit board 1440 comprises a head unit microprocessor 1902 (such as a Texas Instruments AM3703 chip) and an associated oscillator 1904, along with DDR SDRAM memory 1906, and mass NAND storage 1908. For Wi-Fi capability, there is provided in a separate compartment of RF shielding 1934 a Wi-Fi module 1910, such as a Murata Wireless Solutions LBWA19XSLZ module, which is based on the Texas Instruments WL1270 chipset supporting the 802.11b/g/n WLAN standard. For the Wi-Fi module 1910 is supporting circuitry 1912 including an oscillator 1914. For ZigBee capability, there is provided also in a separately shielded RF compartment a ZigBee module 1916, which can be, for example, a C2530F256 module from Texas Instruments. For the ZigBee module 1916 there is provided supporting circuitry 1918 including an oscillator 1919 and a low-noise amplifier 1920. Also provided is display backlight voltage conversion circuitry 1922, piezoelectric driving circuitry 1924, and power management circuitry 1926 (local power rails, etc.). Provided on a flex circuit 1928 that attaches to the back of the head unit circuit board by a flex circuit connector 1930 is a proximity and ambient light sensor (PROX/ALS), more particularly a Silicon Labs SI1142 Proximity/Ambient Light Sensor with an I2C Interface. Also provided are battery charging-supervision-disconnect circuitry 1932 and spring/RF antennas 1936. Also provided is a temperature sensor 1938 (rising perpendicular to the circuit board in the +z direction containing two separate temperature sensing elements at different distances from the circuit board), and a PIR motion sensor 1940. Notably, even though the PROX/ALS and temperature sensors 1938 and PIR motion sensor 1940 are physically located on the head unit circuit board 1440, all these sensors are polled and controlled by the low-power backplate microcontroller on the backplate circuit board, to which they are electrically connected.

Figure 20:
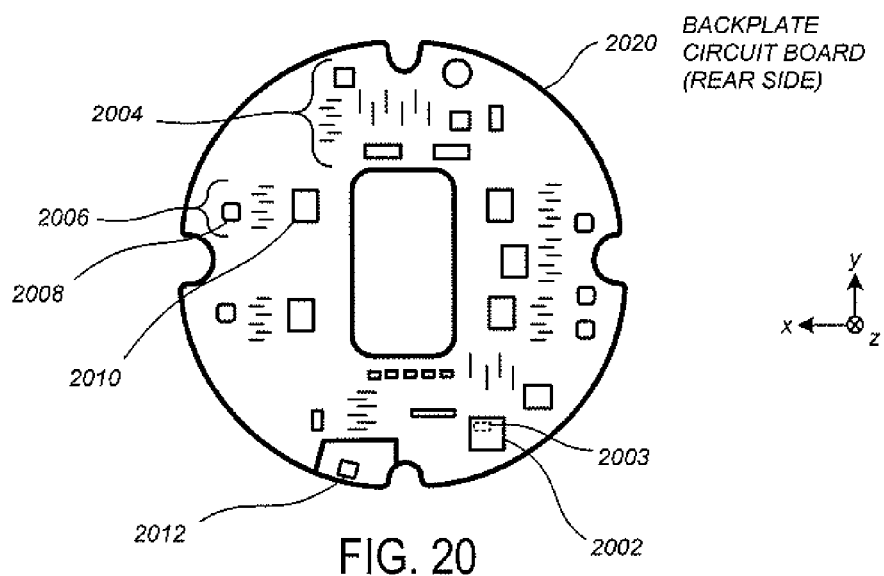
FIG. 20 illustrates a rear view of the backplate circuit board.

FIG. 20 illustrates a rear view of the backplate circuit board. The backplate circuit board 1520 comprises a backplate processor/microcontroller 2002, such as a Texas Instruments MSP430F System-on-Chip Microcontroller that includes an on-board memory 2003. The backplate circuit board 1520 further comprises power supply circuitry 2004, which includes power-stealing circuitry, and switch circuitry 2006 for each HVAC respective HVAC function. For each such function the switch circuitry 2006 includes an isolation transformer 2008 and a back-to-back NFET package 2010. The use of FETs in the switching circuitry allows for "active power stealing", i.e., taking power during the HVAC "ON" cycle, by briefly diverting power from the HVAC relay circuit to the reservoir capacitors for a very small interval, such as 100 micro-seconds. This time is small enough not to trip the HVAC relay into the "off" state but is sufficient to charge up the reservoir capacitors. The use of FETs allows for this fast switching time (100 micro-seconds), which would be difficult to achieve using relays (which stay on for tens of milliseconds). Also, such relays would readily degrade doing this kind of fast switching, and they would also make audible noise too. In contrast, the FETS operate with essentially no audible noise. Also provided is a combined temperature/humidity sensor module 2012, such as a Sensirion SHT21 module. The backplate microcontroller 2002 performs polling of the various sensors, sensing for mechanical wire insertion at installation, alerting the head unit regarding current vs. set point temperature conditions and actuating the switches accordingly, and other functions such as looking for appropriate signal on the inserted wire at installation.

The thermostat 1300 represents an advanced, multi-sensing, microprocessor-controlled intelligent or "learning" thermostat that provides a rich combination of processing capabilities, intuitive and visually pleasing user interfaces, network connectivity, and energy-saving capabilities (including the presently described auto-away/auto-arrival algorithms) while at the same time not requiring a so-called "C-wire" from the HVAC system or line power from a household wall plug, even though such advanced functionalities can require a greater instantaneous power draw than a "power-stealing" option (i.e., extracting smaller amounts of electrical power from one or more HVAC call relays) can safely provide. The head unit microprocessor 1902 can draw on the order of 250 mW when awake and processing, the LCD module 1460 can draw on the order of 250 mW when active. Moreover, the Wi-Fi module 1910 can draw 250 mW when active, and needs to be active on a consistent basis such as at a consistent 2% duty cycle in common scenarios. However, in order to avoid falsely tripping the HVAC relays for a large number of commercially used HVAC systems, power-stealing circuitry is often limited to power providing capacities on the order of 100 mW-200 mW, which would not be enough to supply the needed power for many common scenarios.

The thermostat 1300 resolves such issues at least by virtue of the use of the rechargeable battery 1444 (or equivalently capable onboard power storage medium) that will recharge during time intervals in which the hardware power usage is less than what power stealing can safely provide, and that will discharge to provide the needed extra electrical power during time intervals in which the hardware power usage is greater than what power stealing can safely provide. In order to operate in a battery-conscious manner that promotes reduced power usage and extended service life of the rechargeable battery, the thermostat 1300 is provided with both a relatively powerful and relatively power-intensive first processor (such as a Texas Instruments AM3703 microprocessor) that is capable of quickly performing more complex functions such as driving a visually pleasing user interface display and performing various mathematical learning computations and a relatively less powerful and less power-intensive second processor (such as a Texas Instruments MSP430 microcontroller) for performing less intensive tasks, including driving and controlling the occupancy sensors. To conserve valuable power, the first processor is maintained in a sleep state for extended periods of time and is woken up only for occasions in which its capabilities are needed, whereas the second processor is kept on more or less continuously (although slowing down or disabling certain internal clocks for brief periodic intervals to conserve power) to perform relatively low-power tasks. The first and second processors are mutually configured such that the second processor can wake the first processor on the occurrence of certain events, which can be referred to as "wake-on facilities." These wake-on facilities can be turned on and turned off as part of different functional and/or power-saving goals to be achieved. For example, a wake-on-PROX facility can be provided by which the second processor, when detecting a user's hand approaching the thermostat dial by virtue of an active proximity sensor (PROX, such as provided by a Silicon Labs SI1142 Proximity/Ambient Light Sensor with I2C Interface), will wake up the first processor so that it can provide a visual display to the approaching user and be ready to respond more rapidly when their hand touches the dial. As another example, a wake-on-PIR facility can be provided by which the second processor will wake up the first processor when detecting motion somewhere in the general vicinity of the thermostat by virtue of a passive infrared motion sensor (FIR, such as provided by a PerkinElmer DigiPyro PYD 1998 dual element pyrodetector). Notably, wake-on-FIR is not synonymous with auto-arrival, as there would need to be N consecutive buckets of sensed FIR activity to invoke auto-arrival, whereas only a single sufficient motion event can trigger a wake-on-PIR wake-up.

Figure 21A:
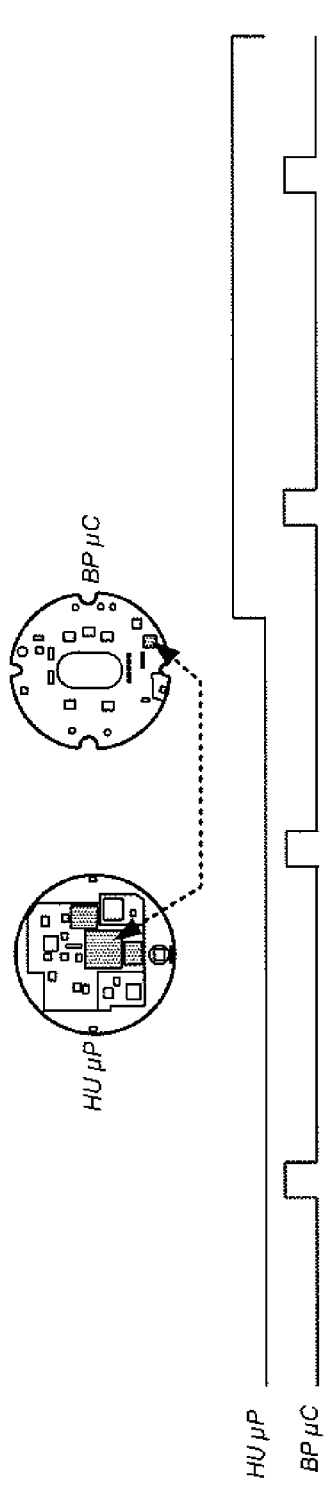
FIGS. 21A-21C illustrate the sleep-wake timing dynamic, at progressively larger time scales.
Figure 21B:
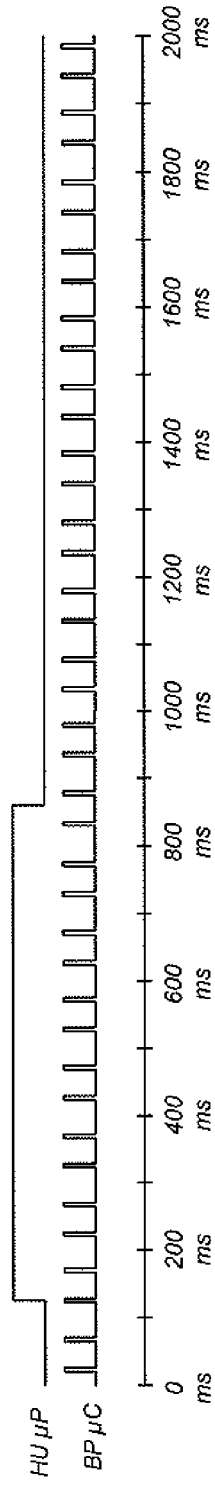
Figure 21C:
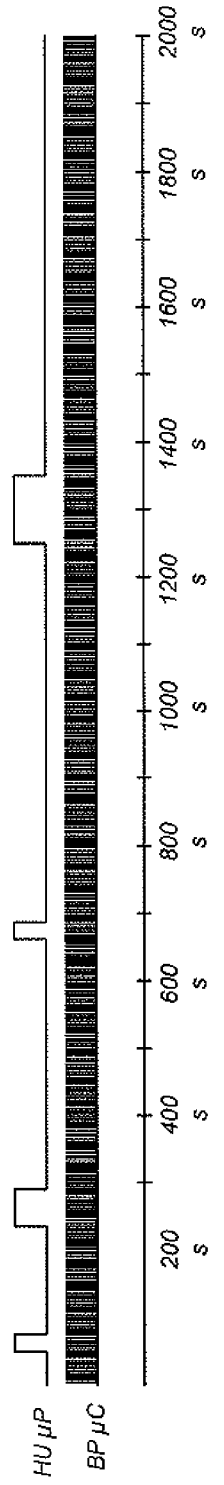

FIGS. 21A-21C illustrate the sleep-wake timing dynamic, at progressively larger time scales. FIGS. 21A-21C illustrate examples of the sleep-wake timing dynamic that can be achieved between the head unit (HU) microprocessor and the backplate (BP) microcontroller that advantageously provides a good balance between performance, responsiveness, intelligence, and power usage. The higher plot value for each represents a wake state (or an equivalent higher power state) and the lower plot value for each represents a sleep state (or an equivalent lower power state). As illustrated, the backplate microcontroller is active much more often for polling the sensors and similar relatively low-power tasks, whereas the head unit microprocessor stays asleep much more often, being woken up for "important" occasions such as user interfacing, network communication, and learning algorithm computation, and so forth. A variety of different strategies for optimizing sleep versus wake scenarios can be achieved by the disclosed architecture and is within the scope of the present teachings.

Figure 22:
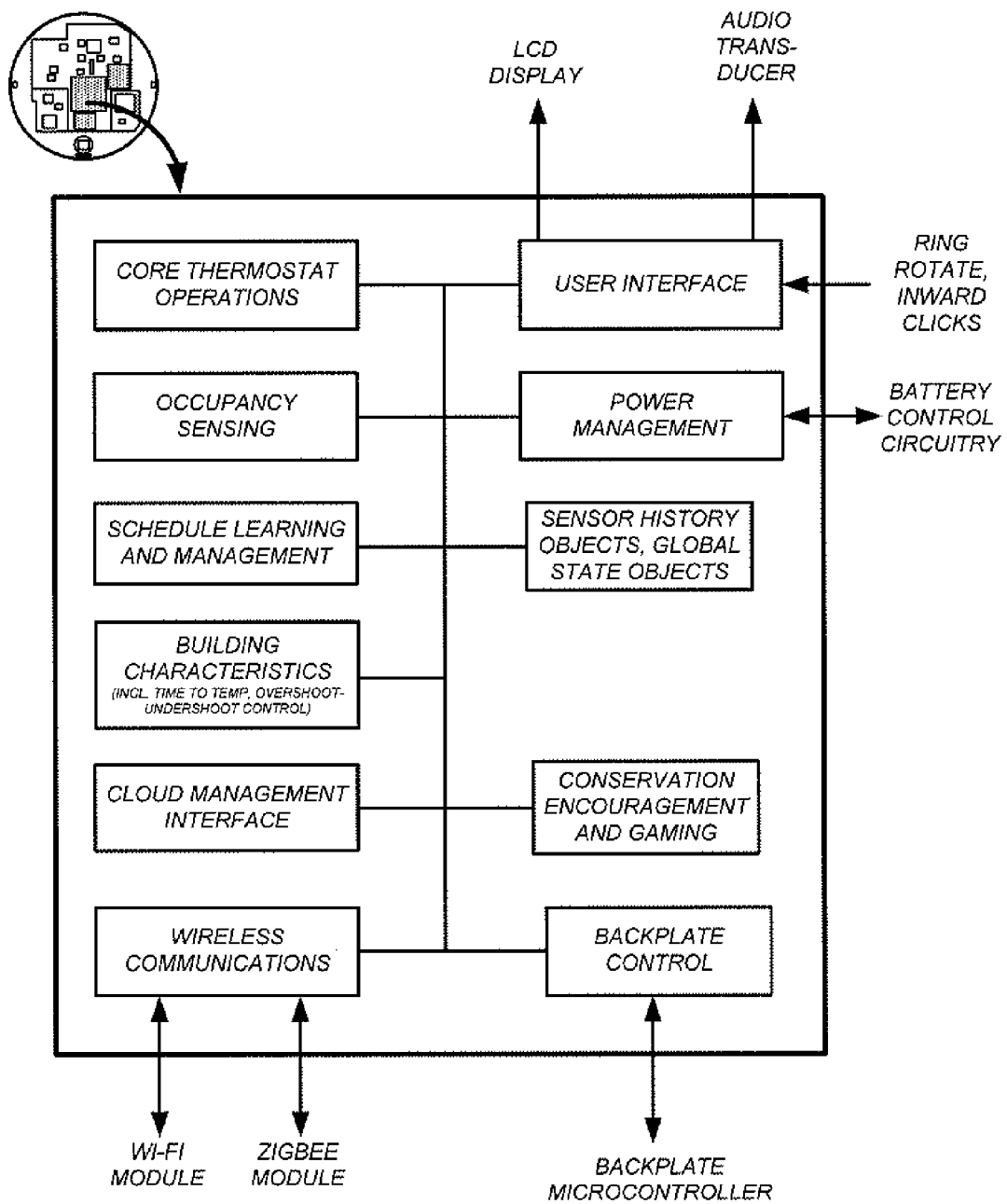
FIG. 22 illustrates a self-descriptive overview of the functional software, firmware, and/or programming architecture of the head unit microprocessor.
Figure 23:
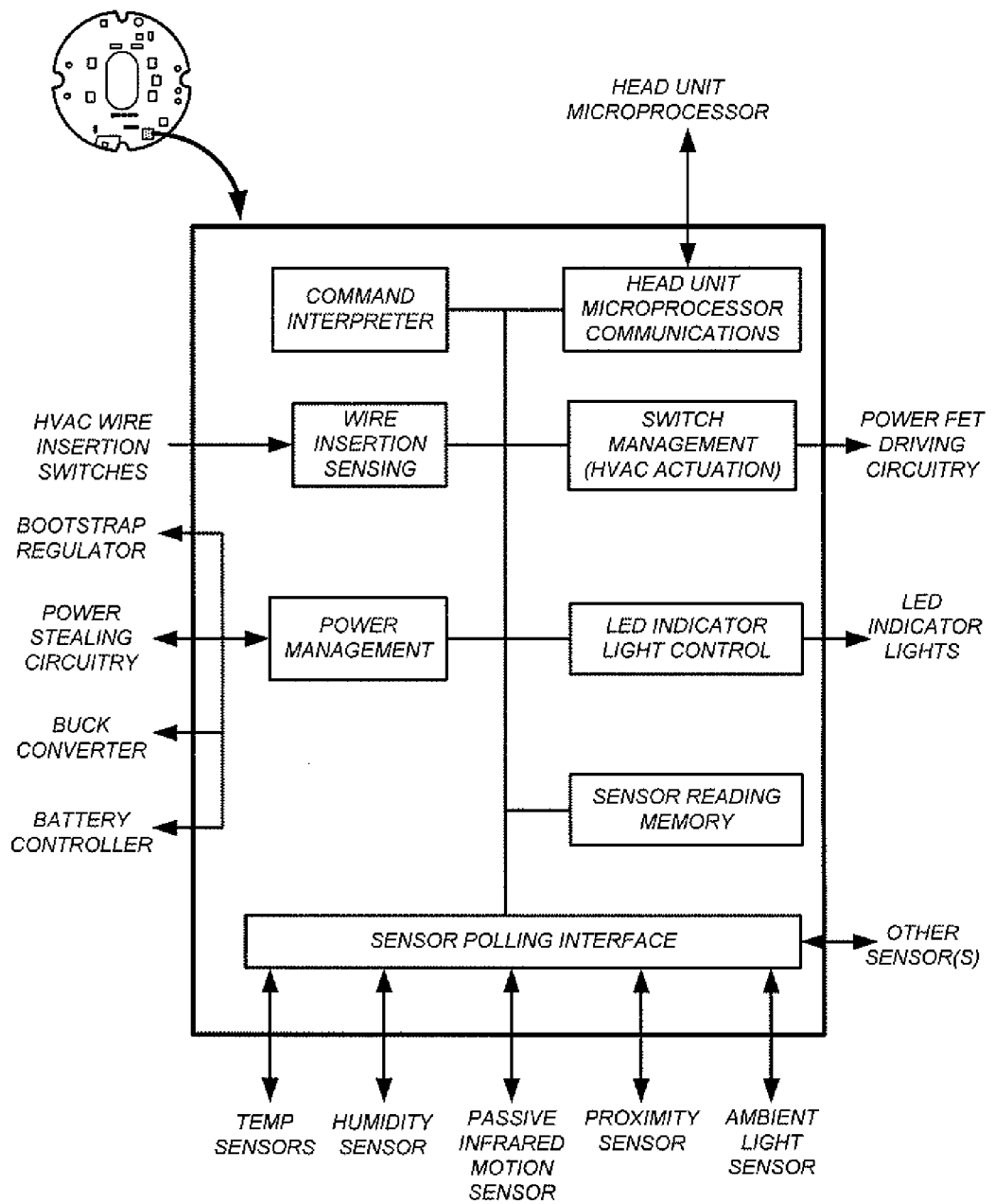
FIG. 23 illustrates the functional software, firmware, and/or programming architecture of the backplate microcontroller.
Figure 24:
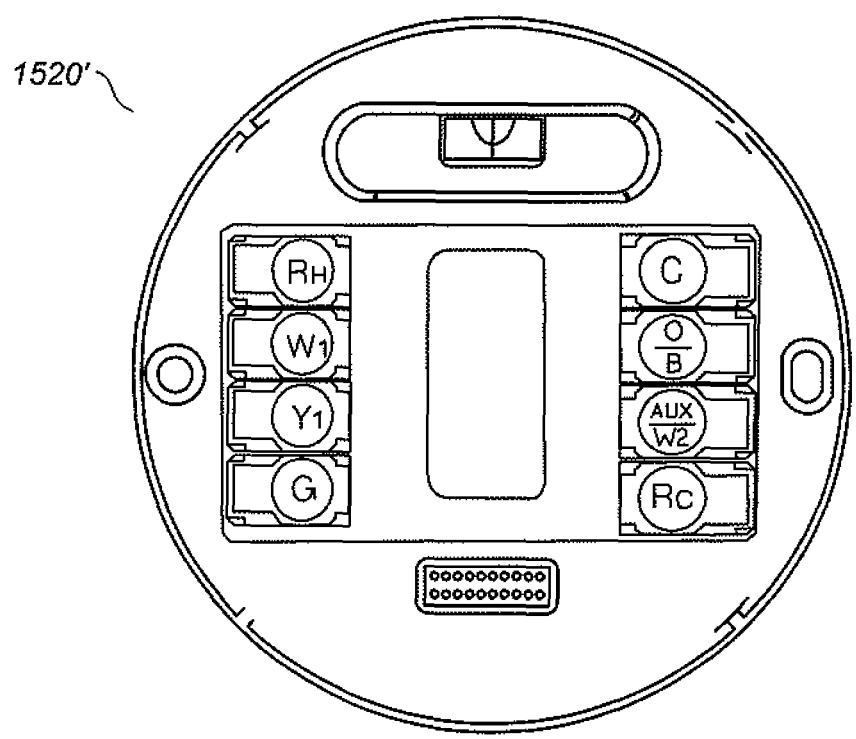
FIG. 24 illustrates a view of the wiring terminals, as presented to the user, when the backplate is exposed.

FIG. 22 illustrates a self-descriptive overview of the functional software, firmware, and/or programming architecture of the head unit microprocessor 1902. FIG. 23 illustrates the functional software, firmware, and/or programming architecture of the backplate microcontroller 2002. FIG. 24 illustrates a view of the wiring terminals, as presented to the user, when the backplate is exposed. Each wiring terminal is configured so that the insertion of a wire is detected and made apparent to the backplate microcontroller and ultimately the head unit microprocessor. According to one example, when the insertion of a particular wire is detected, a further check is automatically carried out by the thermostat to ensure that signals appropriate to that particular wire are present. For one example, a voltage waveform between that wiring node and a "local ground" of the thermostat is automatically measured. The measured waveform should have an RMS-type voltage metric that is above a predetermined threshold value, and when such predetermined value is not reached, then a wiring error condition is indicated to the user. The predetermined threshold value, which may vary from circuit design to circuit design depending on the particular selection of the local ground, can be empirically determined using data from a population of typical HVAC systems to statistically determine a suitable threshold value. In some examples, the "local ground" or "system ground" can be created from the Rh line and/or Rc terminal and whichever of the G, Y, or W terminals from which power stealing is being performed, these two lines going into a full-bridge rectifier (FWR) which has the local ground as one of its outputs.

Figure 25:
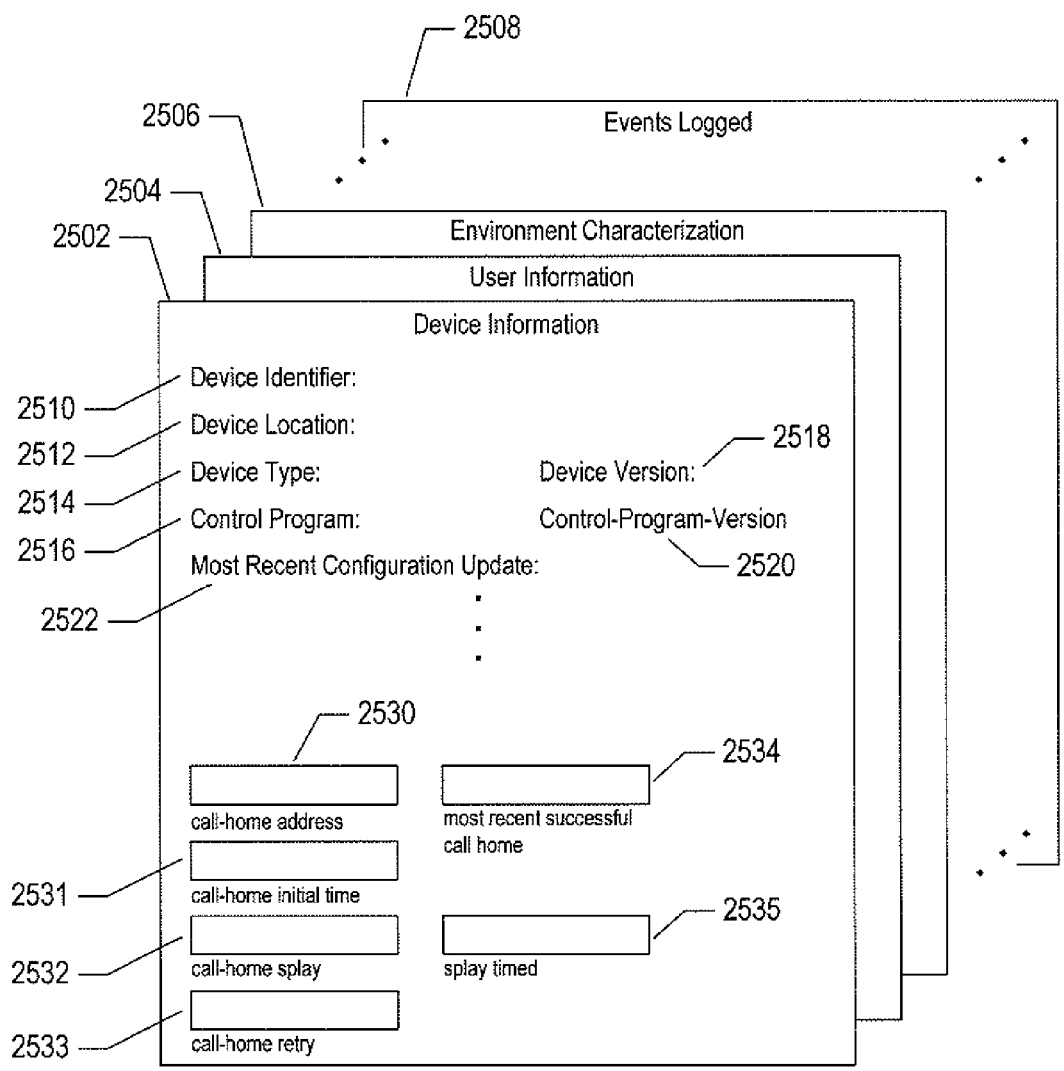
FIG. 25 illustrates, in part, the extensive amount of information that is maintained by an intelligent thermostat during environmental control and monitoring operations.

Distribution of Call-Home Events Over Time to Ameliorate High Communications and Computation Peaks in Intelligent Control System FIG. 25 illustrates, in part, the extensive amount of information that is maintained by an intelligent thermostat during environmental control and monitoring operations. This information may be stored in databases, formatted files, and in other types of electronic data-storage media using any of various types of data-organization and data-storage methods that result in storing data on physical data-storage devices, including electronic memory, electromagnetic disks, and electro-optico-mechanical data-storage devices. The information maintained by an intelligent thermostat may include, as shown in FIG. 25, device information 2502, user information 2504, characterizations of the environment that is being controlled by the intelligent thermostat 2506, monitoring data collected over time by the intelligent thermostat, and various types of events and alarms logged by the intelligent thermostat 2508. Certain details with respect to device information are shown within a device-information page or data structure 2502. The information stored for a device may include a device identifier 2510, a device location 2512, a device type 2514, an identifier of the control program that is installed within the intelligent thermostat 2516, a device version 2518, a control-program version 2520, the date and time of the most recent configuration update 2522, and many other similar types of information. Values for these types of information are not shown in FIG. 25, for simplicity of illustration and because the particular values, such as the values of identifiers, are generally lengthy alphanumeric strings with generally arbitrary formats, sizes, and encodings. An intelligent thermostat may maintain a significant amount of user information, including information used to authorize users, contact information for users, observed patterns of user occupancy and behaviors, and many other types of user information. Environmental-characterization information may contain detailed information with respect to heat sources, heat sinks, insulation factors, large heat-capacity objects and rooms, locations and sizes of windows and window coverings, and details of sensor inputs and sensor-data patterns that correlate with operation of various types of appliances, occupant behaviors, and other activities that may impact intelligent control of the environment in which the intelligent thermostat is located. The intelligent thermostat may record sensor data related to observed events and may also maintain detailed event logs, alarm logs, and other such historical information. The above-discussed stored information is stored by the intelligent thermostat in physical data-storage media, including various types of electronic memories comprising one or more memory integrated circuits, In various implementations of the above-described intelligent-thermostat-based intelligent control system, the intelligent thermostats are configured to exchange information with a central server within a remote intelligent-control system at particular, favorable times during the day. In one implementation, intelligent thermostats are configured to undertake information exchange with a central server shortly after midnight each day. Information exchange may include download of significant amounts of sensor data, event logs, and updates to user information, environment characterization, and other data maintained by the intelligent thermostat. The information exchange also typically involves upload of configuration-information updates, new versions of control programs and other routines that run within the intelligent thermostat, and other information from the central server. These data exchanges can be carried out via the HTTPS protocol over TCP/IP or by any of many other means for downloading and uploading files to and from remote servers.

In certain implementations, this information exchange, referred to as a "call-home event," occurs shortly after midnight, local time, for each and every intelligent thermostat in a particular time zone. As the installed base of intelligent thermostats increases, a large number of call-home events occurring shortly after midnight produces increasingly high peak computational and communications loads on server computers. Creating, maintaining, and managing data centers capable of handling these peak computational and communications loads, but which are otherwise underutilized during most of the day, when call-home events do not occur, is expensive and inefficient. While certain of these expenses and inefficiencies can be ameliorated by using virtual-data centers that can be dynamically reconfigured to provide sufficient computational and communications bandwidth during peak call-home-event periods and scaled back for the majority of the day, when less communications and computing capacity is needed, spikes in communications and computing loads to handle peak call-home event activity may nonetheless results in inefficiencies in intelligent-control-system operation and management. There are often practical limits in communications capacities even for virtual data centers that, when approached or exceeded, result in increasingly inefficient operation as intelligent thermostats fail to establish call-home connections and therefore retry connection attempts.

The current application is directed to a call-home component and methods of managing call-home activities within an intelligent-thermostat-based intelligent control system in order to distribute call-home events over a configurable period of time, rather than scheduling call-home events at a particular time or over a narrow time window. The device data shown in FIG. 25 includes, in the device-information page or data structure 2502, six different information values 2530-2535 that are used, in one implementation, for call-home-event management. The call-home address 2530 is a communications address used by the intelligent thermostat to initiate information exchange with the central server. This may be an IP address, dial-in phone number, or any of many different types of communications addresses or contact identifiers. The call-home address 2530 may include an indication of the type of communications medium with which the call-home address is associated, or this information may be alternatively stored separately, in an additional field not shown in FIG. 25. The call-home initial time value 2531 indicates, by a digitally encoded time value, a time of day during which call-home events are to be initiated. The call-home splay value 2532 is, in one implementation, a random number between 0.0 and 1.0 that is selected, using a pseudo-random-number generator, either by the intelligent thermostat during initial configuration, by a manufacturing facility when the intelligent thermostat is manufactured or processed, or by the intelligent-control system for transmission to the intelligent thermostat during initial configuration or subsequent configurations. The call-home retry value 2533 is a time, in seconds, that an intelligent thermostat should wait before retrying a failed call-home data exchange. The call-home retry value may also be a random number generated within a retry-value range for each intelligent thermostat, may instead be a single retry value assigned to all intelligent thermostats, or may be one of numerous retry values assigned to different groups of intelligent thermostats by the intelligent-control system. The most recent successful call-home data value 2534 indicates date and time of the last successful information exchange with the central server. A splay timed 2535 Boolean value is used during call-home-event management, as discussed further below.

Figure 26:
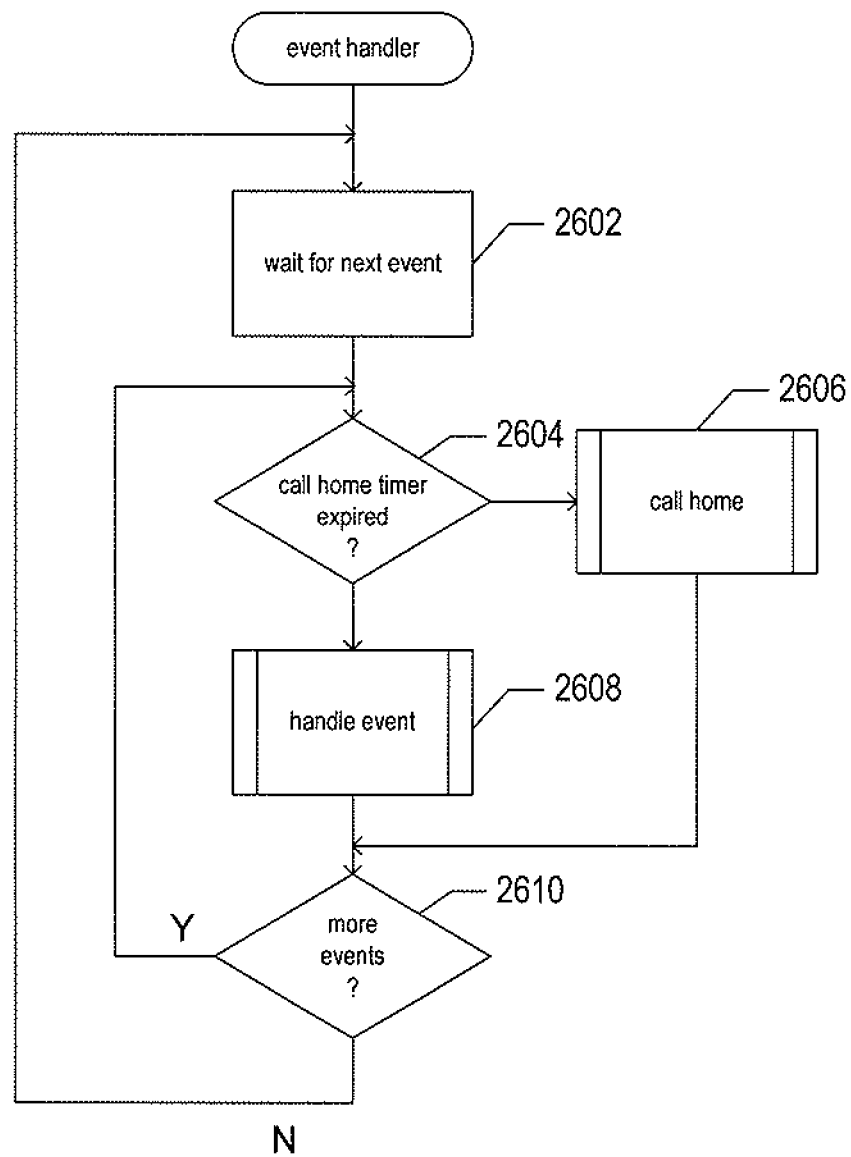
FIGS. 26-28 illustrate, using control-flow diagrams, one implementation of call-home-event management within an intelligent-thermostat-based intelligent-control system that distributes call-home events over a configurable period of time, rather than configuring call-home events be initiated at one local time within a narrow time range.
Figure 27:
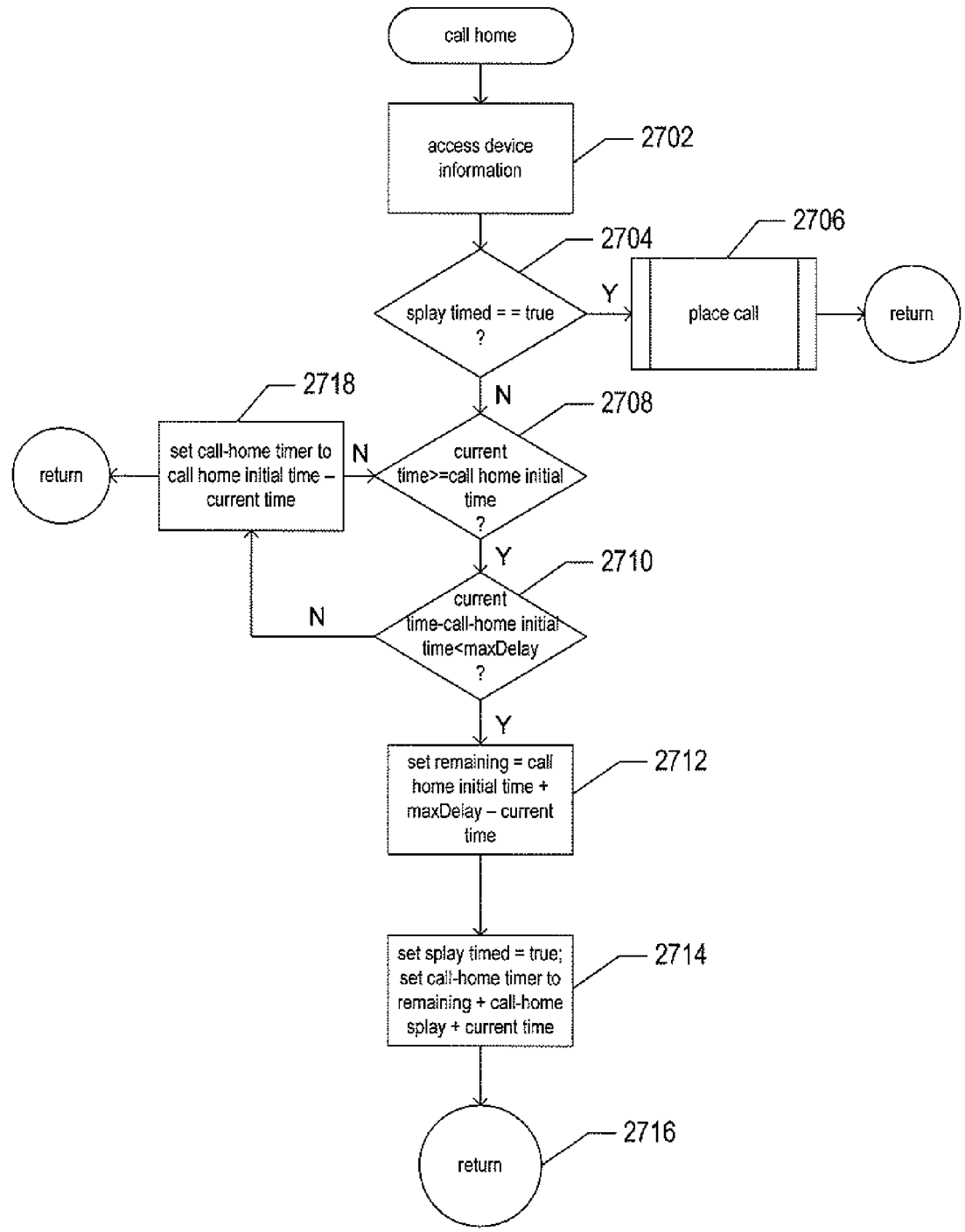
Figure 28:
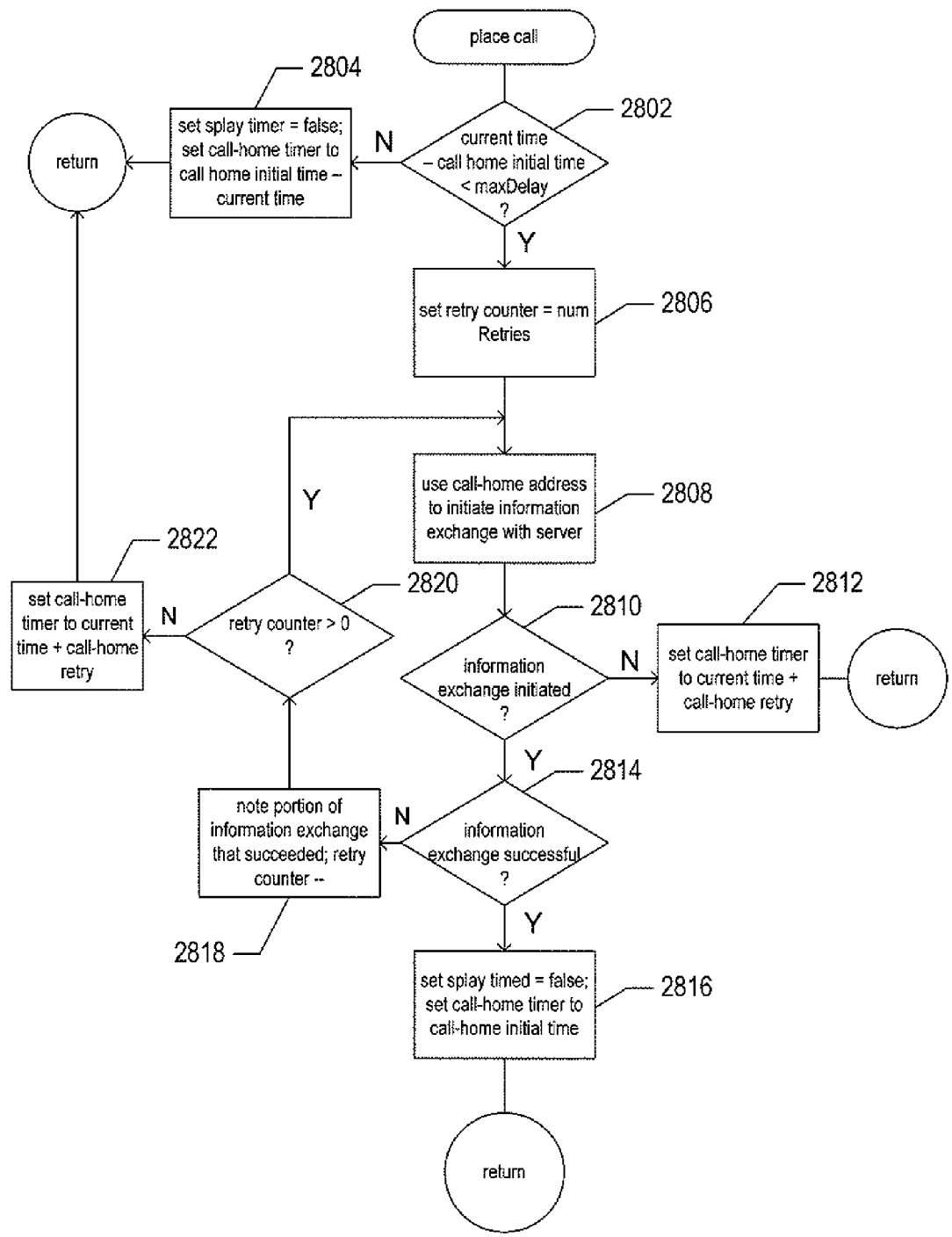

FIGS. 26-28 illustrate, using control-flow diagrams, one implementation of call-home-event management within an intelligent-thermostat-based intelligent-control system that distributes call-home events over a configurable period of time, rather than configuring call-home events be initiated at one local time within a narrow time range. The call-home-event management logic is encoded as computer instructions stored within electronic memories and executed by one or more processors and/or microcontrollers within the intelligent thermostat. FIG. 26 illustrates an event handler that, in certain implementations, lies at the core of intelligent-thermostat operation. The event handler is a continuous loop in which, in step 2602, the control program within an intelligent thermostat waits for a next event to occur and then responds to that event. When a next event has occurred, and that event is an expiration of a call-home timer or other similar timing event related to call-home events, as determined in step 2604, then a call-home routine is called by the event handler in step 2606 to handle the event. Other events are handled in various ways, represented by a call to the handle-event routine 2608. When there are additional events to handle during a particular iteration of the event-handling loop, as determined in step 2610, control flows back to step 2604. Otherwise, control flows back to step 2602 in which the event handler waits until a next event occurs.

FIG. 27 is a control-flow diagram for the call-home routine invoked in step 2606 of the event-handler routine shown in FIG. 26. In step 2702, the call-home routine accesses the stored information related to call-home-event management, such as the data values 2530-2535 shown in FIG. 25 and described above. When splay timed has the value "true," as determined in step 2704, a place-call routine is called, in step 2706, to initiate an information exchange with the central server. Otherwise, when the current time is greater than or equal to the call-home initial time, as determined in step 2708, and when a current time minus the call-home initial time is less than a maxDelay constant value, as determined in step 2710, then, in step 2712, a local variable remaining is set to a time equal to the call-home initial time plus the maxDelay minus the current time and, in step 2714, splay timed is set to "true" and a call-home timer is set to expire at a time equal to the contents of the variable remaining plus the current time added to the call-home splay value (2532 in FIG. 25). The call-home routine then ends, in step 2716. In other words, once the call-home timer initially expires, the call-home routine sets the splay timed value to "true" and sets an additional timer to expire based on the call-home splay value (2532 in FIG. 25). Because the call-home splay values are pseudorandomly generated, the effect of setting the second timer is to distribute call-home events from multiple intelligent thermostats randomly over a period of time equally to maxDelay.

In the described implementation, when the current time is not greater than or equal to the call home initial time, as determined in step 2708, then the call-home routine infers that the time for completing a next call-home event has passed, and sets the call-home timer to correspond to a next time for call-home events, in step 2718. Similarly, when the current time is later than the time range for call-home events, indicated by the maxDelay value, then call-home event processing is deferred until the next time for call-home events, in step 2718. In alternative implementations, an intelligent thermostat may continue to retry a call-home event until the call-home event completes, regardless of how long the intelligent thermostat may need to retry the call-home event. In one implementation, using a 24-hour time-of-day value, the current time is deemed to be greater than or equal to the call-home initial time when the current time falls in a period of 12 hours following the time encoded in the call-home initial time data value. In alternative implementations, other ways of determining whether the current time is an appropriate time to invoke a call-home event may be used.

FIG. 28 provides a control-flow diagram for the place-call routine called in step 2706 of FIG. 27. The place-call routine undertakes an information-exchange between an intelligent thermostat and a remote server that is referred to as a "call-home event." In step 2802, the place-call routine determines whether or not the current time is within a range of times, encoded in the call-home initial time and maxDelay data values, during which a call-home event can be initiated, similar to step 2710 of FIG. 27. When the current time falls outside this range, then the splay timed value is set to false and a call-home timer is set to expire at the next call-home event-initiation time in step 2804. Otherwise, a retry counter is set to a configurable number of allowable maximum retries, in step 2806 and, in step 2808, the intelligent thermostat uses the call-home address value to initiate an information exchange with the remote server. When the information exchange has not been successfully initiated, as determined in step 2810, then a call-home timer is set to expire after a period of time equal to the call-home retry value (2533 in FIG. 25) in step 2812 and the place-call routine ends. Otherwise, when the information exchange has successfully completed, as determined in step 2814, then the place-call routine sets the splay timed value to false and sets a call-home timer to expire at the next time period for initiating call-home events, in step 2816. When the information exchange is not successfully completed, as determined in step 2814, then the place-call routine notes any portion of the information exchange that did succeed, so that portion is not again repeated, and decrements the retry counter, in step 2818. When the retry counter is greater than or equal to zero, as determined in step 2820, then control flows back to step 2808, in which a next attempt to complete the information exchange is carried out. When the retry counter is less than or equal to zero, as determined in step 2820, then a call-home timer is set to expire after the retry period encoded in the call-home retry data value, in step 2822.

Thus, the call-home splay value is used to distribute initiation of call-home events over a period of time defined by the constant maxDelay following an initial call-home time defined by the call-home initial time data value (2531 in FIG. 25). An intelligent thermostat first initiates a call-home event following expiration of the second timer that is set according to the call-home splay data value. The intelligent thermostat may retry failed call-home events periodically, as determined by the call-home retry data value, until the call-home event is successfully carried out or until the period in which call-home events can be initiated has passed. When an intelligent thermostat fails, for whatever reason, to complete a call-home event within the range of time during which call-home events can be initiated, the intelligent thermostat defers to the call-home event until a next call-home-event initiation period, storing data until the data is able to be communicated to the remote server.

The subject matter of this patent specification also relates to the subject matter of the following commonly assigned applications: U.S. Ser. No. 12/881,430 filed Sep. 14, 2010; U.S. Ser. No. 12/881,463 filed Sep. 14, 2010; U.S. Prov. Ser. No. 61/415,771 filed Nov. 19, 2010; U.S. Prov. Ser. No. 61/429,093 filed Dec. 31, 2010; U.S. Ser. No. 12/984,602 filed Jan. 4, 2011; U.S. Ser. No. 12/987,257 filed Jan. 10, 2011; U.S. Ser. No. 13/033,573 filed Feb. 23, 2011; U.S. Ser. No. 29/386,021, filed Feb. 23, 2011; U.S. Ser. No. 13/034,666 filed Feb. 24, 2011; U.S. Ser. No. 13/034,674 filed Feb. 24, 2011; U.S. Ser. No. 13/034,678 filed Feb. 24, 2011; U.S. Ser. No. 13/038,191 filed Mar. 1, 2011; U.S. Ser. No. 13/038,206 filed Mar. 1, 2011; U.S. Ser. No. 29/399,609 filed Aug. 16, 2011; U.S. Ser. No. 29/399,614 filed Aug. 16, 2011; U.S. Ser. No. 29/399,617 filed Aug. 16, 2011; U.S. Ser. No. 29/399,618 filed Aug. 16, 2011; U.S. Ser. No. 29/399,621 filed Aug. 16, 2011; U.S. Ser. No. 29/399,623 filed Aug. 16, 2011; U.S. Ser. No. 29/399,625 filed Aug. 16, 2011; U.S. Ser. No. 29/399,627 filed Aug. 16, 2011; U.S. Ser. No. 29/399,630 filed Aug. 16, 2011; U.S. Ser. No. 29/399,632 filed Aug. 16, 2011; U.S. Ser. No. 29/399,633 filed Aug. 16, 2011; U.S. Ser. No. 29/399,636 filed Aug. 16, 2011; U.S. Ser. No. 29/399,637 filed Aug. 16, 2011; U.S. Ser. No. 13/199,108, filed Aug. 17, 2011; U.S. Ser. No. 13/267,871 filed Oct. 6, 2011; U.S. Ser. No. 13/267,877 filed Oct. 6, 2011; U.S. Ser. No. 13/269,501, filed Oct. 7, 2011; U.S. Ser. No. 29/404,096 filed Oct. 14, 2011; U.S. Ser. No. 29/404,097 filed Oct. 14, 2011; U.S. Ser. No. 29/404,098 filed Oct. 14, 2011; U.S. Ser. No. 29/404,099 filed Oct. 14, 2011; U.S. Ser. No. 29/404,101 filed Oct. 14, 2011; U.S. Ser. No. 29/404,103 filed Oct. 14, 2011; U.S. Ser. No. 29/404,104 filed Oct. 14, 2011; U.S. Ser. No. 29/404,105 filed Oct. 14, 2011; U.S. Ser. No. 13/275,307 filed Oct. 17, 2011; U.S. Ser. No. 13/275,311 filed Oct. 17, 2011; U.S. Ser. No. 13/317,423 filed Oct. 17, 2011; U.S. Ser. No. 13/279,151 filed Oct. 21, 2011; U.S. Ser. No. 13/317,557 filed Oct. 21, 2011; and U.S. Prov. Ser. No. 61/627,996 filed Oct. 21, 2011. PCT/US11/61339 filed Nov. 18, 2011; PCT/US11/61344 filed Nov. 18, 2011; PCT/US11/61365 filed Nov. 18, 2011; PCT/US11/61379 filed Nov. 18, 2011; PCT/US11/61391 filed Nov. 18, 2011; PCT/US11/61479 filed Nov. 18, 2011; PCT/US11/61457 filed Nov. 18, 2011; PCT/US11/61470 filed Nov. 18, 2011; PCT/US11/61339 filed Nov. 18, 2011; PCT/US11/61491 filed Nov. 18, 2011; PCT/US11/61437 filed Nov. 18, 2011; PCT/US11/61503 filed Nov. 18, 2011; U.S. Ser. No. 13/342,156 Filed Jan. 2, 2012; PCT/US12/00008 filed Jan. 3, 2012; PCT/US12/20088 filed Jan. 3, 2012; PCT/US12120026 filed Jan. 3, 2012; PCT/US12/00007 filed Jan. 3, 2012; U.S. Ser. No. 13/351,688 filed Jan. 17, 2012; U.S. Ser. No. 13/356,762 filed Jan. 24, 2012; and PCT/US12/30084 filed Mar. 22, 2012. Each of the above-referenced patent applications is incorporated by reference herein.

Although the present invention has been described in terms of particular embodiments, it is not intended that the invention be limited to these embodiments. Modifications within the spirit of the invention will be apparent to those skilled in the art. For example, call-home-event management can be implemented using many different programming languages, control structures, data structures, underlying control programs, communications protocols, timing devices, and by varying other types of implementation parameters. In the disclosed implementation, call-home events are restricted to a period defined by the constant value maxDelay. In alternative implementations, call-home events may be reinitiated until they succeed, or, when failed, may invoke more elaborate call-home-event handling procedures. In the above-discussed implementation, multiple timers are used to initiate a call-home event, a first timer set to the beginning of a call-home initiation period and a second timer set to a pseudorandomly generated call-home splay time in order to distribute call-home events over a period of time. In alternative implementations, a single timer may be set to a time equal to the sum of the time at which the call-home initiation period begins and the call-home splay time. In yet additional implementations, polling or other techniques may be used in place of timers. The above-disclosed intelligent thermostats create and maintain data structures, files, or other data-storage entities that contain information about the intelligent thermostat, user information, information about the environment controlled by the intelligent thermostat, event logs, and other information. The quantity and types of information stored within an intelligent thermostat may vary with different implementations and designs, including the data stored to control call-home activities. In certain implementations, the call-home splay value is randomly or pseudorandomly generated by an intelligent-control-system computer and downloaded to the intelligent thermostat. In alternative implementations, the call-home splay value may be randomly or pseudorandomly generated by the intelligent thermostat. The call-home splay value, and other data values involved in call-home-event control stored within an intelligent thermostat, may be updated by a remote server, in certain implementations. In alternative implementations, the call-home splay value may be encoded within an intelligent thermostat during manufacture or in a post-manufacture process. In certain implementations, rather than generating a call-home splay time for each intelligent thermostat, the intelligent control system may instead randomly or pseudorandomly generate a call-home time for each intelligent thermostat.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An intelligent thermostat within an intelligent control system, the intelligent thermostat comprising:
    a processor;
    an electronic memory;
    a time-offset value stored within the electronic memory, wherein the time-offset value is randomly or pseudo randomly generated and stored in the electronic memory during a manufacturing process; and
    instructions stored within the electronic memory that, when retrieved and executed by the processor, control the intelligent thermostat to establish a communications connection to a remote server of the intelligent control system at a time offset from the beginning of a call-home period by the time-offset value.

2. The intelligent thermostat of claim 1 wherein the time-offset value is randomly or pseudorandomly generated by a remote intelligent-control-system computer and downloaded to the intelligent thermostat.

3. The intelligent thermostat of claim 1 wherein the time-offset value is randomly or pseudorandomly generated by the intelligent thermostat.

4. The intelligent thermostat of claim 1 wherein the time-offset value is altered during a post-manufacturing process.

5. The intelligent thermostat of claim 1 further including a first data value, stored in the electronic memory, that indicates the time of the beginning of the call-home period and a second data value, stored in the electronic memory, that indicates a communications address through which the communications connection is established.

6. The intelligent thermostat of claim 1 wherein the intelligent thermostat is controlled by the instructions stored within the electronic memory to establish a communications connection during each 24-hour interval to a remote server at a time offset from the beginning of a call-home period by the time-offset value.

7. The intelligent thermostat of claim 6 wherein the intelligent thermostat, following establishment of the communications connection, receives one or more of configuration-information updates and new versions of control programs that run within the intelligent thermostat from the remote server.

8. The intelligent thermostat of claim 6 wherein the intelligent thermostat, following establishment of the communications connection, downloads to the remote server one or more of accumulated sensor data, event logs, and environment-characterization information.

9. The intelligent thermostat of claim 6 wherein, by establishing a communications connection at a time offset from the beginning of a call-home period by the time-offset value, the establishment of the communications connection and subsequent data exchange is less likely to overlap, in time, with establishment of communications connections and data transfers carried out by other intelligent thermostats than were the intelligent thermostat to attempt to establish a communications connection at the beginning of a call-home period.

10. A method for data exchange between a number of remote intelligent thermostats, each having a processor and an electronic memory, and one or more servers within an intelligent control system, the method comprising:
storing a randomly or pseudorandomly generated time-offset value in the electronic memory of each of the number of intelligent thermostats, wherein the time-offset value is randomly or pseudo randomly generated and stored in the electronic memory during a manufacturing process; and
establishing, by each intelligent thermostat, a communications connection to one of the one or more servers of the intelligent control system at a time offset from the beginning of a call-home period by the time-offset value stored in the electronic memory of the intelligent thermostat.

11. The method of claim 10 further including:
randomly or pseudorandomly generating a time-offset value by a computer of the intelligent control system for each of the number of intelligent thermostats; and
transmitting the time-offset value for each intelligent thermostat from a server of the intelligent control system to the intelligent thermostat for storage in the electronic memory of the intelligent thermostat.

12. The method of claim 10 further including:
randomly or pseudorandomly generating a time-offset value by each of the number of intelligent thermostats; and
storing the time-offset value in the electronic memory of the intelligent thermostat.

13. The method of claim 10 further including:
randomly or pseudorandomly generating a time-offset value by a manufacturer for each of the number of intelligent thermostats; and
altering the time-offset value for each intelligent thermostat in the electronic memory of the intelligent thermostat by the manufacturer during a post-manufacturing process.

14. The method of claim 10 further including storing, in the electronic memory of each of the number of intelligent thermostats, a first data value that indicates the time of the beginning of the call-home period and a second data value that indicates a communications address through which the communications connection is established.

15. The method of claim 10 wherein each of the number of intelligent thermostats establishes a communications connection during each 24-hour interval to a remote server at a time offset from the beginning of a call-home period by the time-offset value.

16. The method of claim 15 wherein each of the number of intelligent thermostats, following establishment of the communications connection, receives, from the remote server, one or more of configuration-information updates and new versions of control programs that run within the intelligent thermostat.

17. The method of claim 15 wherein each of the number of intelligent thermostats, following establishment of the communications connection, downloads to the remote server one or more of accumulated sensor data, event logs, and environment-characterization information.

18. The method of claim 15 wherein, by establishing a communications connection at a time offset from the beginning of a call-home period by the time-offset value by each of the number of intelligent thermostats, the establishment of the communications connections and subsequent data exchanges by the number of intelligent thermostats are less likely to overlap, in time, than were the number of intelligent thermostats to attempt to establish communications connections at the beginning of a call-home period.

* * * * *